United States Patent [19]

Nor et al.

[11] Patent Number: 5,204,611

[45] Date of Patent: Apr. 20, 1993

[54] CHARGING CIRCUITS FOR RECHARGEABLE BATTERIES AND CELLS

[75] Inventors: Jiri K. Nor; Josef V. Soltys, both of Oakville, Canada

[73] Assignee: Norvik Technologies Inc., Mississauga, Canada

[21] Appl. No.: 676,523

[22] Filed: May 2, 1991

[30] Foreign Application Priority Data

Mar. 13, 1991 [CA] Canada .................. 2038160

[51] Int. Cl.⁵ .............................................. H02J 7/10
[52] U.S. Cl. ............................... 320/21; 320/23; 320/39; 320/35; 320/52
[58] Field of Search ................ 320/21, 20, 32, 39, 320/40, 35, 52, 23

[56] References Cited

U.S. PATENT DOCUMENTS

| | | | |
|---|---|---|---|
| 3,531,706 | 9/1970 | Mullersman | 320/20 |
| 3,576,487 | 4/1971 | Chase | 320/39 |
| 3,624,481 | 11/1971 | Macharg | 320/39 |
| 3,886,428 | 5/1975 | Macharg | 320/39 |
| 3,987,353 | 10/1976 | Macharg | 320/39 |
| 4,006,396 | 2/1977 | Bogut | 320/2 |
| 4,061,956 | 12/1977 | Brown et al. | 320/22 |
| 4,388,582 | 6/1983 | Saar et al. | 320/20 |
| 4,392,101 | 7/1983 | Saar et al. | 320/20 |
| 4,607,208 | 8/1986 | Vreeland | 320/21 |
| 4,667,143 | 5/1987 | Cooper et al. | 320/22 |
| 4,745,349 | 5/1988 | Palanisamy et al. | 320/22 |
| 4,977,364 | 12/1990 | Kordesch et al. | 320/21 |
| 4,992,722 | 2/1991 | Maruyama et al. | 322/37 |
| 5,089,762 | 2/1992 | Sloan | 320/13 |

FOREIGN PATENT DOCUMENTS

| | | |
|---|---|---|
| 0074444 | 3/1983 | European Pat. Off. |
| 0311460 | 4/1989 | European Pat. Off. |
| 0394074 | 10/1990 | European Pat. Off. |
| 3924499 | 1/1991 | Fed. Rep. of Germany |
| 2205765 | 5/1974 | France |
| 1448720 | 9/1970 | United Kingdom |

OTHER PUBLICATIONS

Journal of the Electrochemical Society, Jun. 1960, pp. 480 to 483, Kordesch et al.

Primary Examiner—Steven L. Stephan
Assistant Examiner—B. Davidson
Attorney, Agent, or Firm—Donald E. Hewson

[57] ABSTRACT

Circuits are provided whereby rechargeable batteries and cells are charged very fast by a controlled current, and substantially at a rate never exceeding the ability of the battery or cell to accept current—i.e., to convert electrical current to stored chemical energy. The resistance free terminal voltage of the battery or cell is detected during an interval when the charging current is interrupted, and compared against an independent reference voltage to control the charging current when a difference between the reference voltage and the sensed resistance free terminal voltage exists. The reference voltage may be altered at any instant in time, as a function of the ambient temperature, or the internal temperature or pressure of the battery, as a function of the charging current when it is within a predetermined range, or if a particular change in the value of the charging current occurs over a predetermined period of time. Charging characteristics may also be controlled and altered either through the passage of time or as a consequence of predetermined conditions occurring. The various provisions preclude thermal runaway for example, and assure very rapid and complete charging operations no matter what may be the condition of the battery—provided it is capable of accepting charge—and for various kinds of rechargeable batteries and cells including nickel cadmium, lead acid, and so on.

48 Claims, 8 Drawing Sheets

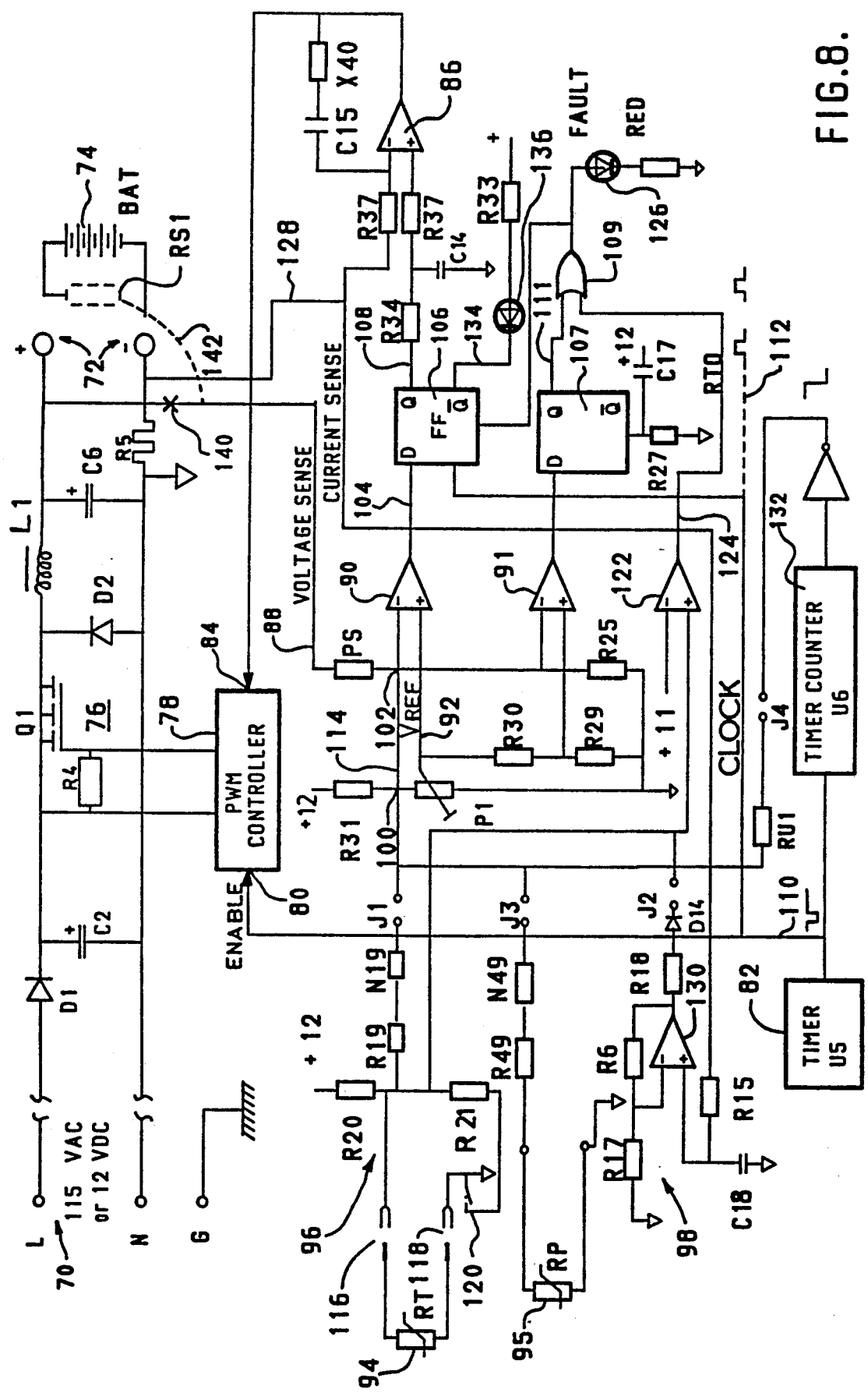

CHARGING CIRCUITS FOR RECHARGEABLE BATTERIES AND CELLS

FIELD OF THE INVENTION

This invention relates to battery chargers, or more particularly to circuits for charging rechargeable batteries and cells. The rechargeable batteries and cells that can be recharged from circuits and methods of the present invention may range in value from very low voltage—less than 1 or 1.5 volts—with very low capacities—in the order of several hundred mAh—up to batteries in the range of from 12 or 24 volts up to several hundred volts, and with capacities in the range of hundreds to several thousand ampere-hours. The present invention provides circuits and methods consistent with the above, and provides circuits whereby the rate of charge current delivered to the rechargeable battery or cell being charged may be in the range of 10C to 15C, or more, and may be regulated down to a trickle charge.

BACKGROUND OF THE INVENTION

The applicant herein is the applicant in co-pending U.S. application Ser. No. 07/253,703 filed Oct. 6, 1988, and assigned to a common assignee herewith—and corresponding to EPO Publication No. 0 311 460 published Apr. 12, 1989. That previous application teaches a battery charger where a principal feature is the fact that the battery charger can deliver a current to a rechargeable battery or cell initially at a rate in amperes greater than the capacity in ampere-hours of the battery—in other words, at a rate greater than 1C. Therefore, the rechargeable battery or cell being charged may be rapidly charged.

Another feature of the previous invention is that means are provided for detecting the internal resistance free voltage of the rechargeable battery or cell being charged, and comparing it to a pre-selected reference voltage which is independent of the battery being charged. In other words, for a particular type and rating of rechargeable battery or cell to be charged, a reference voltage is pre-selected and is generated within the charger circuits. (It is possible that the reference voltage may be pre-selected by switch setting or the like, with prior knowledge of the condition, rating, and type of rechargeable battery or cell to be charged.) The resistance free voltage is compared to the internally generated reference voltage at an instant in time when the charging current being delivered to the rechargeable battery or cell has been interrupted.

The prior invention provides that, as the internal resistance free voltage of the rechargeable battery or cell being charged exceeds the pre-selected reference voltage, means are provided to reduce the electrical charging current and thereby reduce the rate of charging the rechargeable battery or cell, in order to maintain the internal resistance free voltage at a value equivalent to the pre-selected reference voltage. In other words, if it is noted that the internal resistance free voltage of the rechargeable battery or cell being charged marginally exceeds the reference voltage, then that is an indication that the rate of charging current delivered to the rechargeable battery or cell is too high, and the rate of delivery of the charging power—i.e., the charging current—is reduced.

The present invention provides circuits that are in some way similar to those described in the above referenced U.S. application and EPO published specification, in that it has been determined that conditions may exist when it is desirable to have better control over the charging process, or conditions may exist where it is important to have control over the reference voltage against which the resistance free terminal voltage is being compared, so as to prevent unwanted overcharging characteristics of any sort. Overcharging may occur in some circumstances, for example in the event that the internal temperature of the rechargeable battery or cell is or becomes high, or even in the event that the ambient temperature in which the charger is operating is or becomes high. Further, it is sometimes important to monitor not only the resistance free terminal voltage of the rechargeable battery or cell being recharged, but also the rate of charge, because the onset of certain charge current conditions may be indicative of an unwanted overcharge condition occurring.

Recharging may occur in respect of a great many different kinds of rechargeable batteries or cells. Common conditions and types, however, particularly include nickel-cadmium that may be used in household toys and appliances; and more particularly for such rechargeable batteries and cells—especially nickel cadmium—which are used in significant quantities in products such as rechargeable hand tools and video camcorders. Other rechargeable batteries (or cells in some conditions) may be lead-acid systems: they may be found in very small sizes in portable audio tape/radio devices; and in much larger embodiments in forklift trucks, golf carts and the like, and electric vehicles. The voltage and capacity of such lead acid batteries may be from 2 volts (for a single cell) up to hundreds of volts and more, with capacities rated from fractions of an ampere-hour to thousands of ampere-hours. Obviously, particularly for large battery installations, it is desirable to provide charging currents consistent with the method of rapid charging, and if the rate of charging may be in the range of 5C to 10C or 15C, then the charging current may be in the range of several hundreds or thousands of amperes.

It must be noted that battery charging occurs when there is a capability of the rechargeable battery or cell to accept charging current—in other words, battery charging occurs as a function of the charging current and of the state of charge of the battery or cell being charged. In order for there to be a flow of current from the charging circuits to the rechargeable battery or cell to be charged, there is a terminal voltage for the charging circuit provided that is higher than the rest voltage of the cell or battery to be charged. There is, therefore, by the difference between those two voltages, a driving voltage—often referred to as "overvoltage" or "polarization"; and that voltage may, itself be controlled. But, it is also important to note that the cell voltage or battery voltage being spoken of is the resistance free terminal voltage thereof—that is, the terminal voltage of the rechargeable battery or cell being charged at a time during its charging sequence when flow of the charging current to the battery or cell has been interrupted. This eliminates all voltage losses due to resistances anywhere in the charging circuit or within the battery or cell being charged, and is therefore a true indication of the electrochemical voltage of the battery or cell. It is also to be noted, however, that the determination of the resistance free terminal voltage is taken rather soon after the flow of charging current has been interrupted, so as to preclude internal changes occurring within the battery due to time dependent electrochemical effects. Thus, it is the steady state resistance free terminal voltage that is important to be detected. Those voltages differ, of course, for various kinds of cell or battery types: such as, for example, nickel cadmium (where the resistance free terminal voltage of a freshly charged cell may be in the order of about 1.38 volts, and of a substantially discharged cell at about 1.19 volts, about where the voltage for the most part remains at about 1.2 volts); or lead acid (where the resistance free terminal voltage may vary from about 1.90 volts to about 2.45 volts).

It is one of the purposes of the present invention, as described in greater detail hereafter, to assure that any temperature rise within a battery or cell being charged comes as a consequence solely of the thermodynamics of the charging reactions and of the internal resistance of the battery or cell, and not as a consequence of the overcharge electrochemical processes occurring in the cell. As a consequence, it is a corollary of that purpose that battery chargers in keeping with the present invention provide higher efficiency when compared with conventional battery chargers.

To achieve that purpose, the charging circuits must be capable of determining that point during the charging cycle when overcharging of the battery or cell is about to occur. In other words, the battery charger must be capable of the determining the instantaneous capability of the battery or cell to accept charging current, and to adjust the rate of delivery of the charging current accordingly. It happens that, by being able to demonstrate those characteristics, battery chargers according to the present invention have the effect of removing or eliminating the memory characteristic that is so prevalent with nickel cadmium batteries and cells— especially when the nickel cadmium battery or cell has been charged at a slow rate if it has not yet been fully discharged. It has been the practice, in the past, especially for persons using hand-held tools or camcorders, and the like, either to continue to operate the device until such time as it fails due to substantially complete discharge of the battery, or sometimes such as at the end of the day to remove the battery from the device and forcibly discharge it so as to assure that it has been fully discharged, before recharging it.

Moreover, when batteries and cells such as nickel cadmium are charged at a relatively low rate, it is possible that short circuits can occur within the battery, and that is much less likely to happen when the battery is charged at a high charging rate. Of course, in nearly every instance, battery chargers according to the present invention provide an initial high charging current if the battery or cell to be charged can accept such a current. As a consequence, it has been found that the cell life—that is, the number of recharge cycles to which a battery or cell may be subjected—may be increased by a factor of two or three in the case of nickel cadmium batteries or cells when they are consistently charged using battery chargers of the present invention.

Thus, battery chargers of present invention are capable of providing just small quantities of recharging energy to partially discharged batteries or cells, without harming them. That, in turn, suggest that designers of devices using such batteries can ultimately design them to use batteries having lesser capacity than at present, thereby resulting in those applications having lower capital cost of manufacture and of acquisitions by the user. By being able to provide a "topping up" charge to such as lead-acid batteries or cells, deep discharge and therefore the adverse effects of deep discharge on battery life, is avoided. Still further, because the present invention provides battery charges that are capable of recharging batteries in a very short period of time, the necessity for duplicate or standby batteries, or the necessity for taking the battery operated device out of service for a significant period of time to recharge the battery, are eliminated or overcome.

A typical example of the above might be a golf cart. Usually, golf carts have six 6-volt batteries each having a capacity of the about 134 ampere-hours. Such batteries have costs in the range of about $400.00,and the total weight is in the range of about 200 kilograms. If it were accepted that when the player using the golf cart returns the cart to be re-used by the next player, and that the next player will not use the cart for about 15 or 20 minutes, it is possible to provide the cart with three 12-volt batteries, each having a capacity of about 70 ampere-hours. That installation is capable of being recharged in about 15 or 20 minutes by battery chargers of the present invention; and such a battery installation may be obtained at a cost of approximately $200.00 and may have a weight of about 100 kilograms. Still further, a lighter golf cart can, itself, be designed, so that its range may be extended or in any event its capital cost reduced due to the lighter battery weight that it might carry.

Another typical example is cordless—that is, handheld —battery powered hand tools. It has been noted that manufacturers of such tools continually increase the size of the battery packs they require in order to provide them with longer operating periods; and that by providing heavier and larger battery packs, the tool becomes bulkier and heavier. Since it was the intention of battery powered hand-held power tools to be small and easy to handle and manipulate, the provision of heavier and bulkier battery packs is contrary to the initial purpose for which those tools were developed. On the other hand, by providing battery chargers in keeping with the present invention, the designer or manufacturer of the hand-held battery powered tools can bring to the public a tool with a much smaller battery. and which is therefore much easier to handle. The battery packs can be very quickly recharged, such as during a work break for refreshment, so that the capital cost of acquisition especially by professional tradesmen and the like can be reduced and convenience of use enhanced.

Still other circumstances may be such as for handheld portable telephones or portable dictating machines, such as the one on which the present application has been drafted. Such machines—and portable audio machines in general, especially those having recording capabilities—may have various current demands placed on the batteries which power them, depending on whether they are in a recording or playback mode, or if they are rapidly spooling tape from one reel to the other in the machine.

It should also be noted that in a further alternative embodiment of the invention, as discussed hereafter, means are provided for determining the internal pressure of the battery or cell being charged, and to alter or terminate the charging operation as a consequence of the sensed internal pressure.

PRIOR ART

Applicant refers, in particular, to the following prior art as being of specific interest or note. The prior art comprises a number of patents and one publication, and is directed in one way or another to battery charging. However, the prior art is generally not directed towards battery charging where control is achieved by or is a function of the resistance free terminal voltage of the rechargeable battery or cell being charged.

Reference is first made to a paper by Dr. Karl Kordesch et al entitled "Sine Wave Controlled Current Tester for Batteries", published at pages 480 to 483 of *Journal of the Electrochemical Society* for June, 1960. That paper is one of the first references to measurement of the resistance free terminal voltage of the battery being charged, and suggests the use of a portable instrument operated from a 60 Hz source to make direct meter readings of the resistance free terminal voltage, and in some way or other to make use of that reading for state-of-charge determination and charge control purposes.

One of the first patents to teach resistance free charging is CHASE, U.S. Pat. No. 3,576,487, Apr. 27, 1971. That patent teaches the use of a multivibrator which turns on and off, thereby permitting pulsed charging current to be fed to the battery. During current interruptions, the battery voltage is sensed and compared against the reference. If the sensed battery voltage exceeds a predetermined value, the charging operation stops. There is no control other than that when the main charging operation terminated, a trickle charge continues to be fed to the battery.

Another early patent is MULLERSMAN, U.S. Pat. No. 3,531,706, Sep. 29, 1970, which teaches a charger that delivers pulsed D.C. charging current, and which senses temperature compensated resistance free terminal voltage of the sealed cell being charged. The purpose is that the flow of high charge rate current to the sealed cell may be terminated as the cell reaches nearly full voltage and it is important for there to be a thermal integrator within the sealed cell unit if possible. A voltage responsive controller is provided, whose purpose is to terminate charging function when the voltage across the terminals of the sealed cell unit reaches a predetermined value.

BROWN et al provide in their U.S. Pat. No. 4,061,956 dated Dec. 6, 1977, a D.C. battery charger which has a number of secondary functions whereby the status of the battery being charged is determined from signals that are indicative of the battery terminal voltage and the temperature of the battery. Brown et al are particularly concerned with providing a boost signal to charge the battery in keeping with a pre-selected charging program which is related to the state of charge of the battery as determined by measurements of its voltage and temperature. The Brown et al patent contemplates a variety of charging programs, depending on the nature of the battery and the manner of its installation. Brown et al is also specifically concerned with the possibility of short circuited cells, and terminates or inhibits a charging operation if a short circuited cell is determined.

MACHARG was granted U.S. Pat. No. 3,886,428 on May 27, 1975, and a U.S. Pat. No. 3,987,353 on Oct. 19, 1976, each relating to a controlled system for battery chargers. Each battery charger is useful for a variety of batteries, but is particularly intended for use with lead acid batteries. In each Patent, Macharg derives a control signal by extracting the internal resistance voltage drop once the charging current has been switched off, and then differentiating the rate of decay of the open-circuit terminal voltage of the battery. A voltage is then derived from this differential to control the magnitude of the charging current, in order to progressively reduce the charging current; and Macharg is particularly concerned with the phenomenon of gas generation, noting that gas generation has been detected as a result of a significant differential in the rate of decay of the open-circuit terminal voltage having occurred.

SAAR et al have related U.S. Pat. Nos. 4,388,582 of Jun. 14, 1983 and 4,392,101 of Jul. 5, 1983. Both patents are directed to fast charging circuits for nickel cadmium batteries, or others, and particularly of the sort that may be used in hand-held portable tools. What Saar et al are particularly concerned with, however, is to analyze the charging characteristic or profile of the battery and on the basis of pre-selected criteria adjust the charging characteristic when one or a particular series of values are determined. Override provisions may also be employed, in the event that the battery being charged fails to exhibit the charging characteristics that are expected of it.

SUMMARY OF THE INVENTION

The present invention provides circuits and methods for charging rechargeable batteries and cells. The circuits have a variety of specific design criteria, so that the present invention can provide for temperature compensation, and it can produce variable reference voltages which are contingent upon a number of factors including the temperature of the battery or indeed its state of charge acceptance capability. Various and quite complex timing features are provided. Yet another feature of the present invention is that, with certain design preconditions for the battery pack being charged, the precise characteristic of that battery pack and therefore the number of cells and the charging voltage to be delivered to the battery pack, can be automatically determined. Yet other features of the present invention provide for fine or detailed improvements to the charge cycle, whereby undesirable side effects such as thermal runaway—which may otherwise be undetectable using ordinary sensing operations—may be precluded or inhibited.

Thus, in its general sense, the present invention provides a circuit for charging rechargeable batteries and cells where a source of electrical charging energy is provided, and is delivered across an output of these circuits to which the rechargeable battery or cell may be connected. Between the source of electrical charging energy and the rechargeable battery or cell to be charged there is a power control circuit, e.g. of the switching inverter type, and it is arranged so that the rate of the amount of charging energy to be delivered—and therefore the charging current—may be regulated under the control of at least one sensing circuit and a control circuit. The sensing circuit includes means for detecting the terminal voltage of the rechargeable battery or cell, and a comparator means compares the detected terminal voltage with a reference voltage so that an output signal from the comparator is provided when a difference between those voltages exists. A pulsed timing signal which controls short interruption of the charging circuit is provided. and it also controls a latching means so that the latched output of the comparator means is delivered to a control circuit which controls the level of power delivered by the switching inverter under pulsed conditions as determined by the pulsed timing signal. When there is a predetermined relationship of the detected terminal voltage and the reference voltage, which is determined when the charging current has been interrupted—in other words, a predetermined relationship of the resistance free terminal voltage of the rechargeable battery or cell being charged with respect to the reference voltage—the operation of the controlled circuit is determined. The duty ratio of the switching sequence of the switching inverter is determined by the smoothed output of the latching means, so that the rate of the delivery of charging energy—the charging current—is controlled. In keeping with an important feature of the present invention, the reference voltage against which the resistance free terminal voltage is compared, may itself be altered at any instant in time as a consequence of the status of the rechargeable battery or cell being charged.

Even more broadly stated than above, it can be considered that the switching inverter device may be viewed as a power controller means which is in series with the source. The power controller means is arranged so that the rate of the amount of energy being delivered to the rechargeable battery or cell—the charging current—which is connected across the output of the charging circuits, may be regulated as stated above under the control of at least one sensing circuit and a control circuit. Briefly stated, typical power controllers apart from power transistors and MOSFET's described in greater detail hereafter, may be such items as silicon controlled rectifiers, linear regulators, switching regulators, and switching magnetic amplifiers.

The status of the rechargeable battery or cell being charged —by reference to which the reference voltage may be altered—includes its temperature, or the temperature of the ambient in which the battery charging circuits are operating. To make that determination, temperature sensitive devices are provided, where the temperature sensitive device may be mounted so as to be affected by the internal temperature of the battery or cell, or by the ambient temperature; and in any event, so that the reference voltage against which the resistance free terminal voltage of the battery or cell is compared may be algebraically affected by the temperature of the temperature sensitive device.

The present invention provides that when the temperature sensitive device becomes, for one reason or another, inoperative, the circuit arrangement is such that an inoperative temperature sensitive device will cause the charging circuit to be turned off, thus resulting in a failsafe operation.

Still further, the present invention provides means whereby the value of the charging current being fed to the rechargeable battery or cell may affect the value of the reference voltage. Thus, the state of charge acceptance capability of the battery or cell being charged may, itself, further affect the manner in which the rechargeable battery or cell is being charged.

Moreover, the present invention also provides means for sensing the internal pressure of the rechargeable battery or cell being charged. The pressure sensing means can be arranged to affect the reference voltage (or, as discussed generally hereafter, the sensed terminal voltage) so that under certain conditions the pressure status of the rechargeable battery or cell being charged controls the operation of the charger to either alter or terminate the charging operation.

Alternatively, the circuits of the present invention may also be arranged so that the input to the comparator means which compares the detected terminal voltage with a reference voltage and which produces an output signal when a difference between those voltages exists, where the output signal from the comparator passes through the latching means to a control circuit so as to control the switching of the switching inverter or the operation of the power controller, may be slightly differently connected. Thus, the present invention also contemplates that the value of the detected terminal voltage may be altered as a consequence of the status of the rechargeable battery or cell being charged, rather than the reference voltage itself being, altered as a consequence of the status of the rechargeable battery or cell being charged. Generally, the algebraic effect of the signal which comes as a consequence of the status of the rechargeable battery or cell being charged would be applied to the detected terminal voltage signal in the opposite sense to the manner in which it would be applied in the more usual course to the reference voltage so as to alter that reference voltage as a consequence of the status of the rechargeable battery or cell being charged.

Needless to say, the present invention provides for suitable visual and other annunciator means to indicate the ongoing operation of the charger, its status, or whether the charging operation has been terminated.

The present invention also provides a method of recharging rechargeable batteries and cells which, in general, comprises the following steps:

(a) providing an electrical charging current from a source thereof to an output across which a rechargeable battery or cell may be connected;

(b) periodically interrupting the flow of electrical charging current to determine the resistance free terminal voltage of the battery or cell being charged, and comparing the sensed resistance free voltage with a reference voltage which is independent of the rechargeable battery or cell being charged;

(c) delivering the electrical charging current to the output of the charger for a fixed and predetermined period of time at the lesser of a predetermined maximum current value or the ability of the rechargeable battery or cell to accept a charging current. In the event that the ability of the rechargeable battery or cell to accept a charging current is greater than a predetermined maximum current value, then the electrical charging current is delivered at that maximum current value; and after the first fixed period of time the electrical charging current continues to be delivered at the maximum value if it was being delivered at the termination of the first fixed period of time, for so long as the sensed resistance free terminal voltage of the rechargeable battery or cell is less than the independent reference voltage. The second variable time period is terminated at the first instance when the sensed resistance free voltage reaches the same value as the independent reference voltage. At that time, the electrical charging current being fed to the rechargeable battery or cell is permitted to reduce, but the reduction of the electrical charging current is in such a manner that the sensed resistance free voltage and the independent reference voltage remain at the same value. In other words, the reduction of the electrical charging current follows the charge acceptance curve of the rechargeable battery or cell being charged:

(d) a timer is operated from the beginning of the charge cycle so that, following a third predetermined period of time measured from the beginning of the charge cycle, the electrical charging current is reduced to a predetermined value of from zero to a predetermined low charging current in the event that it is still at the maximum value; and (e) also, a timer is operated so that at the end of a fourth predetermined period of time which follows the instant when the charging current begins to be reduced, the electrical charging current is forceably reduced to a predetermined value of from zero to a trickle current.

In keeping with another feature of the present invention, the rechargeable battery or cell being charged is constantly monitored to determine if any one cell in the battery is faulty. In the event that a faulty cell is detected, the charging operation is instantaneously terminated and an alarm signal is given to that effect.

As a further variation on the above constant monitoring activity for a faulty cell, the monitoring procedure is inhibited for a first predetermined period of time which is shorter than the first fixed period noted above, so that the charging current may be delivered to the output at its maximum value. This permits a short period of time when an otherwise idle or deeply discharged battery is first connected to the charger for there to be at least an initial setting up of electrochemical reaction within the cells of the battery before specific monitoring of the faulty cell within the battery is made. Generally, that first period of time when testing for a faulty cell is inhibited lasts for a period of time depending on the type and capacity of the battery, and the charging current used, and may typically be between 15 seconds and 3 minutes.

In yet another variation of the methods of charging cells and in keeping with the present invention, after termination of step (c) as noted above, a different step (e) is initiated whereby the value of the electrical charging current is constantly sample on a periodic basis and compared with the value of the electrical charging current at the prior sampling thereof. If an increase in the electrical charging current is sensed, or is sensed over a predetermined period of time depending on the manner and storage of the periodic value of the sensed charging current, then another control circuit is operated so as to force the electrical charging current to continue to reduce. This procedure effectively precludes the possibility of thermal runaway.

Still further, the electrical charging current may be forced to reduce in a controlled manner either to a trickle current, or even to zero.

As yet a further fine variation, if a decrease of current of at least a predetermined amount within a predetermined period of time is sensed, then control circuit means are operated to force the electrical charging current to assume a different change of value over a further predetermined period of time. Thus, the slope of the charge current characteristic against time may, itself, be controlled.

A still further variation of the above recognizes that, in some circumstances, a finishing charge which is greater than a trickle charge may be required to bring the state of the charge held by the rechargeable battery or cell fully to 100%. In that case, as the charging current is reducing, it may reach a level intended for a predetermined finishing charge current which may be at a value of about 0.5 C to 3 C. At that time, a further charge period of constant current at that predetermined finishing charge current value is initiated and the resistance free voltage of the battery or cell being charged is continued to be determined. The finishing charge current is terminated at the earlier of the first instance where a predetermined period of time measured from the beginning of the charge cycle expires, or in the event that prior to that time the sensed resistance free voltage has increased above the value of the independent reference voltage by a predetermined amount. Moreover, if an increase in the electrical charging current is sensed, and if at that instant in time the electrical charging current is higher than either the intended value of the finishing charge or even the intended value of trickle charge, the charging current may be reduced to either of the finishing charge value or the trickle charge value.

As a still further variation of the methods according to the present invention, the internal pressure of the rechargeable battery or cell being charged may be sensed. That sensing may affect the reference voltage in the same way as the temperature sensing affects the reference voltage. The charging operation may be altered or terminated upon a predetermined change of internal pressure of the rechargeable battery or cell being sensed, or when a predetermined absolute internal pressure of the rechargeable battery or cell is reached.

BRIEF DESCRIPTION OF THE DRAWINGS

The above features, and other provisions and variations thereof, are described in detail hereafter. Certain general features with respect to battery charging, and the theoretical and governing aspects thereof, and typical charging characteristics and circuits which achieve those characteristics, are also discussed. Thus, the discussion hereafter is made in association with the accompanying drawings, in which:

FIG. 8 is a circuit of a typical charger in keeping with the present invention:

DESCRIPTION OF THE PREFERRED EMBODIMENTS

Figure 1:
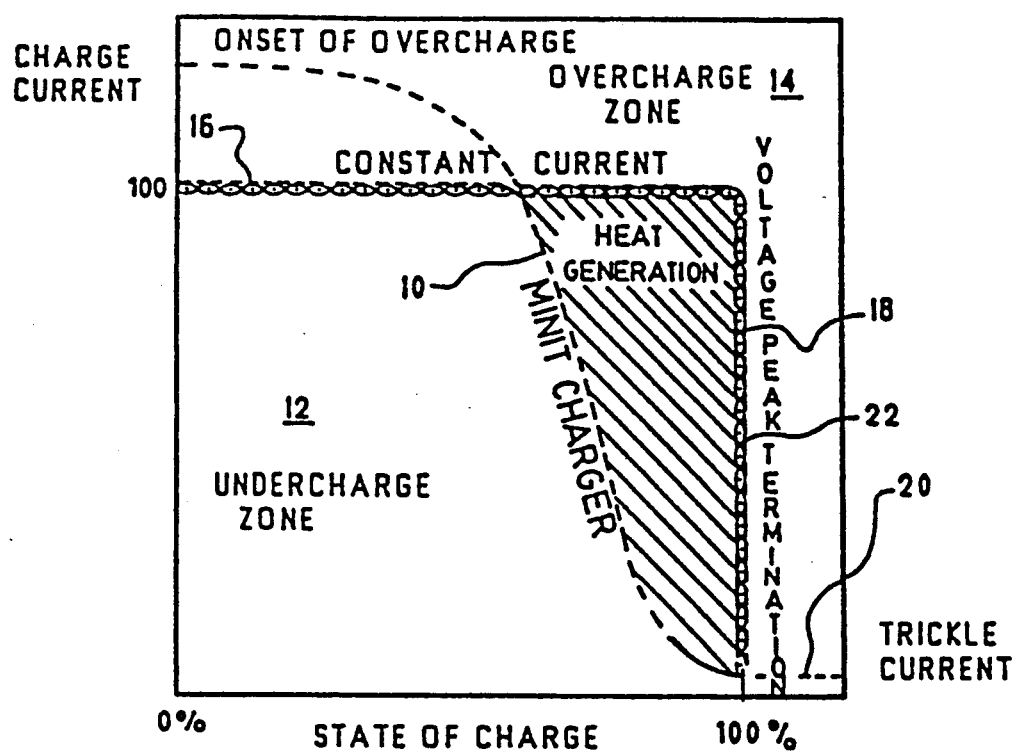
FIG. 1 is a typical charge acceptance curve for a battery showing the co-relation of charge current, and undercharge and overcharge zones, with the state of charge of a battery or cell being charged, as the state of charge progresses in time.

Having regard to FIG. 1, the basic principles of the present invention, and the considerations of charging characteristics and charge acceptance characteristics of a rechargeable battery or cell are now reviewed. What FIG. 1 shows is a characteristic relationship of charge current against state of charge of the battery or cell, it being understood that the state of charge varies as charge is delivered to the battery or removed from it. A typical curve 10 is shown, which signifies the maximum charge current that the battery is capable of accepting—i.e., converting charge current into stored chemical energy—as a function of its state of charge. This curve essentially divides the figure into two zones; the zone 12 that is under the curve 10 being the undercharge zone for the battery or cell, and the zone 14 that is above the curve 10 being the overcharge zone for the battery or cell being charged. Also shown is a line 16 which intersects with a line 18, and the curve which comprises lines 16 and 18 may be considered to be the curve of an ordinary prior art charger which charges a battery or cell at a constant current until such time as a particular terminal voltage is reached—which voltage is intended to represent 100% of the state of charge of the battery or cell—at which time the constant current is terminated and reduces either to zero or to a trickle charge. The trickle charge is shown at 20, and is, in any event, an extension of curve 10 past line 18 (i.e., after the occurrence of the condition represented by line 18).

By 100% state of charge, it is understood that the battery or cell being charged has reached 100% of its capacity of stored energy, measured in ampere-hours. However, state of charge per se is not a characteristic that can be specifically measured except by fully discharging the cell or battery to determine what the state of charge was at the time that the discharge operation was begun. On the other hand, the capability of the battery or cell to accept charge is a function of its state of charge; and if higher current is fed to the battery or cell than it is capable of accepting to increase its state of charge, then heat and gases are produced within the battery or cell. The area 22 which is above the curve 10 but below the curve 16,18 represents a domain or set of conditions where overheating will occur under charge conditions such as proposed by curve 16,18.

Chargers in keeping with the present invention will follow curve 16, which may be at 10C—the charging current level as shown in FIG. 1, but may be at any other value such as 3C or 4C, or even up to 20C—until such time as the state of charge condition is reached where curve 16 intersects curve 10. At that time, and as discussed in greater detail hereafter, adjustment of the charge current is made. Thus, curve 10 represents the charge acceptance curve.

If a charging current is fed into the battery or cell, and as the state of charge increases, the electrochemical carriers within the battery or cell are one by one converted from the discharged into the charged state. Thus, as charge progresses, there are fewer and fewer carriers still available for conversion, and the ability of the battery or cell to accept charge decreases. If, at that time, when the reduced density of carriers means that the battery or cell is incapable of accepting a current beyond a certain limit, forcing the charge current beyond that limit does not result in faster charging, but results in elevating the electrode potentials to the electrolysis level —which results in the evolution of gases and excess heat. Overcharging of the battery or cell occurs, and damage may begin to be experienced within the battery or cell. It is that circumstance which charging circuits of the present invention seek to overcome, by recognizing when the charge carriers are no longer capable of handling an incoming charge current and thereby reducing the incoming current to match the decreasing ability of the carriers to handle the incoming charge current. Those features are discussed below.

The following discussion is directed particularly at nickel cadmium cells, or batteries made up of a number of nickel cadmium cells for such use as in hand-held power tools, camcorders, and the like. At their equilibrium cell voltage of approximately 1.2 volts per cell, nickel cadmium cells have a negative temperature coefficient in the order of $-4mv/\cdot C$. As noted above, the cells are charged at a higher charger terminal voltage, so that there is a driving voltage which is the differential between the charger terminal voltage and the rest cell voltage. Moreover, it is noted that even the industry which provides nickel cadmium cells to the market—especially those having sintered electrodes—recognizes the capability of those cells to tolerate very high discharge rate circumstances of up to 10C: whereas the recommended charging rate is usually only about 0.1C.

The charge reactions within a nickel cadmium cell are as follow:

$$2Ni(OH)_2 + 2OH^- \rightarrow 2NiOOH \cdot H_2O + 2e \quad (1)$$

$$Cd(OH)_2 + 2e \rightarrow Cd + 2OH^- \quad (2)$$

It should be noted that the limitation of the low recommended charging rate of about 0.1C is not related to the charge reactions noted above, but rather to the overcharge reaction (3)—shown below—which may occur on the positive electrode of a nickel cadmium cell, and to the overcharge reactions (4) and (5)— shown below—which occur on the negative electrode of a sealed nickel cadmium cell, or the overcharge reaction (6)—shown below—which occurs at the negative electrode of a vented nickel cadmium cell. Those overcharge reactions are:

$$4OH^- \rightarrow 2H_2O + O_2 + 4e \quad (3)$$

$$O_2 + 2Cd + 2H_2O \rightarrow 2Cd(OH)_2 \quad (4)$$

$$O_2 + 2H_2O + 4e \rightarrow 4OH^- \quad (5)$$

$$2H_2O + 2e \rightarrow H_2 + 2OH^- \quad (6)$$

When sealed cells are being charged, the oxygen evolution which comes as a result of overcharge reaction (3) generates pressure within the cell, and that in turn accelerates the consuming reactions of the evolved oxygen as shown in overcharge reactions (4) and (5). However, it should be noted that at a low charging rate of about 0.1C, for example, the pressure within the sealed cell remains at about 1 atmosphere: whereas, at a charging rate of only 1.0C, the pressure within the sealed cell could exceed 10 atmospheres for ordinary cells, and even 5 atmospheres for special high rate cells which have special designs to enhance oxygen recombination. Thus, faster charging is only possible if the charging current is controlled, or stopped, before significant overcharge conditions of the cell occur. Moreover, the recombination reactions are slower at low temperatures, so that if the cell temperature is reduced by about 40C, the operating pressure within the cell will usually double. Therefore, for cold batteries there is a significant risk of the cell safety valve opening, which would result in loss of the electrolyte from the cell, especially if the cold cell is being rapidly charged other than by the circuits and methods of the present invention.

Figure 2:
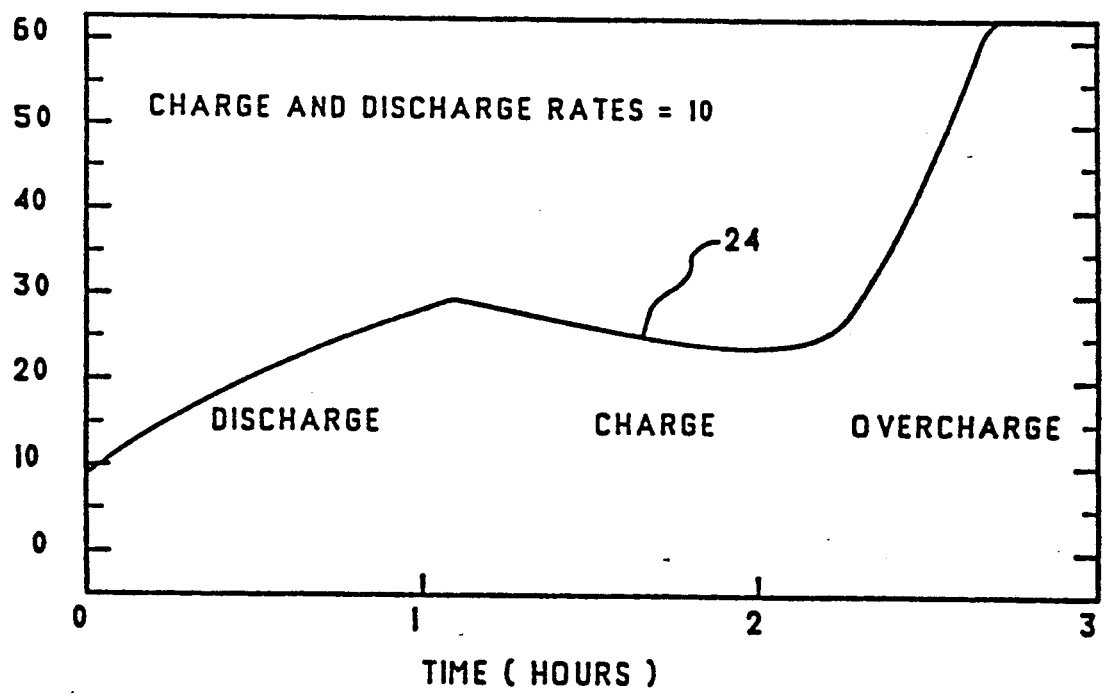
FIG. 2 shows the thermal effects of discharge, charge, and overcharge, of a typical small nickel cadmium cell, at a relatively low charging rate of 1C.

Still further, the overcharge reactions (3), (4), and (5), for sealed cells, may also result in significant heating within the cell. On the other hand, the charge reactions (1) and (2) will generally result in a slight cell cooling due to the negative heat of reaction of about 0.06 kcal/Ah. That negative heat of reaction may or may not be masked by heat evolution within the cell due to the internal resistance of the cell. Also, the discharge reaction of the cell will naturally show the opposite heat effect to the negative heat of reaction of reactions (1) and (2). It has been determined that if the cell were to be thermally insulated, the charging reaction at very low charge rates could cool the cell by about 10° C. but the subsequent overcharge period could increase the cell temperature by at least 20° C. for every 10% of capacity over the full charge of the cell. This is illustrated in FIG. 2 where charge and discharge, and overcharge, are all contemplated at a 1C rate. Curve 24 shows a rise in temperature from less than 10° C. to above 30° C. over slightly more than one hour of discharging, with a reduction in temperature for the next hour of charging to about 25° C. but then a significant increase in temperature over the next half hour or so of overcharging.

Thus, the present invention is fully aware of the fact that the overcharge phase as noted in FIGS. 1 and 2 may occur even before the charging of the cell has been completed. However, at high charge rates, the ability of the cell to accept charge may fall below the rate of charge even when the state of charge is only at a fraction of its full capacity, so that the overcharge reactions may set in, with the commensurate heat and pressure consequences, well before the cell is fully charged.

Most of the prior art demonstrates charging methods where the charging current is delivered in short, high energy pulses that are separated by zero current intervals during which information about the state of charge is obtained. As described above, that information may strictly be the resistance free terminal voltage, or as in Macharg or Mullersman it may relate to a determination of voltage decay rate during the interval of zero charge current. Some of the heat which is due to the overcharge reactions can be eliminated; but by delivering short pulses of high current and therefore subjecting the cell to high voltage drops, irreversible heating due to the internal resistance of the cells will occur.

It follows that controlling the charging current to just below the level where overcharge conditions begin, as demonstrated in FIGS. 1 and 2, is ideal, since both over-pressure and over-temperature conditions should be avoided. Circuits of the present invention, where current interruptions of only a few milliseconds are employed, are able to detect the onset of overcharge reactions within the cell and thereby reduce the charging current to a safe level so as to charge the cell at the highest current possible without overcharging. In other words, circuits of the present invention will follow the charge acceptance curve of the cell or battery after the time that the constant current curve 16 intersects the charge acceptance curve 10, as shown in FIG. 1.

Figure 3:
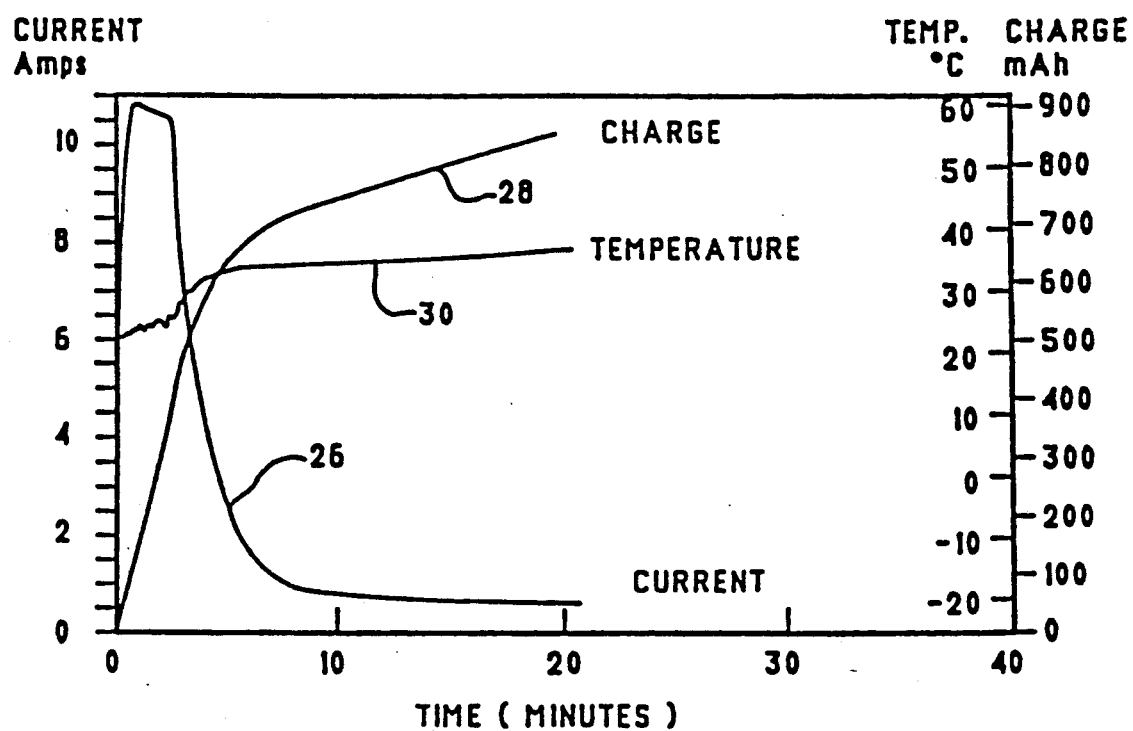
FIG. 3 shows typical current, cell temperature, and accumulated charge characteristics of a nickel cadmium cell charged under very rapid conditions in keeping with the present invention.

For example, reference is made to FIG. 3, where the charge, temperature and current characteristics of half-height sub-C cells having capacities of about 650 mAh are shown. It should be noted that the initial current as shown in curve 26 is delivered at almost 18C for about 3 minutes, whereby nearly 90% of the charge of the cell is delivered in the first 5 minutes as shown at curve 28. At the same time, curve 30 shows that the internal temperature of the cell increased by only about 10° C. where the initial temperature of the cell was at about ordinary room temperature.

Figure 4:
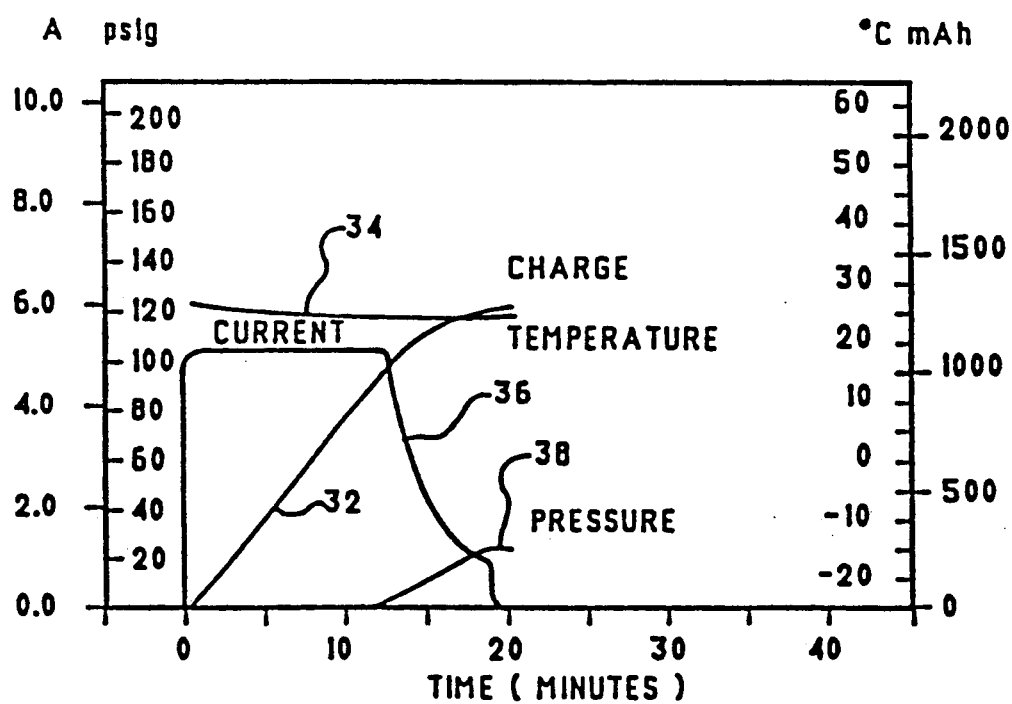
FIG. 4 shows another set of curves for a somewhat larger cell charged over a slightly longer period of time, showing also the effects on internal cell pressure.

FIG. 4 shows still further curves for sub-C cells having capacities of about 1200 mAh. However, the charge curve 32, cell temperature curve 34, and charging current curve 36, are joined by curve 38 which shows internal cell gauge pressure. The charging is a nominal 15 minute charge at a current rate of about 4C, so that at about 12 or 13 minutes the current began to reduce and the charge reached about 90% of its rated capacity. It will be noted that a negligible increase of pressure occurred within the cell, and that the increase in pressure leveled off at about 18 minutes when the charge current was reduced to zero. The temperature within the cell actually decreased very slightly over the entire charging operation.

Figure 5:
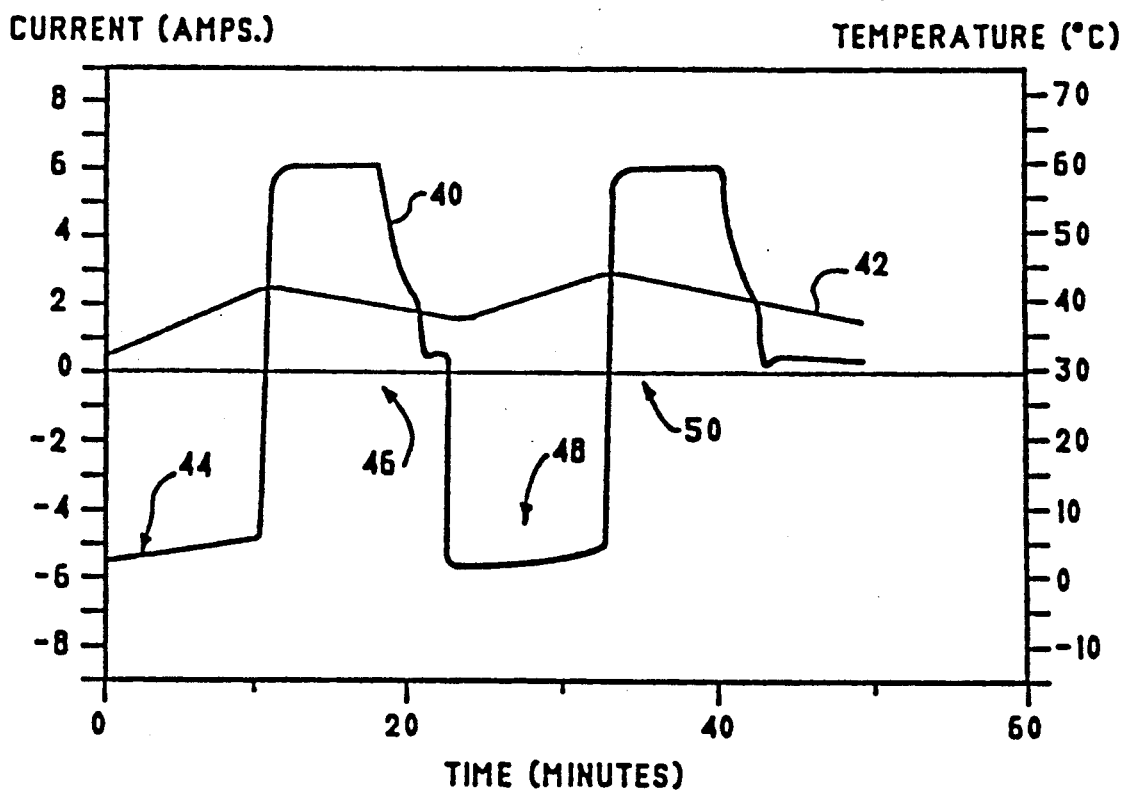
FIG. 5 shows typical current and temperature conditions of the cell being charged and discharged under rather heavy duty conditions using a charger of the present invention.

The purpose of FIG. 5 is to show typical current and temperature conditions by curves 40 and 42, respectively, for ordinary cells of the sort whose charging characteristics are shown in FIG. 4. Here, however, the charging current is slightly higher, at about 5C. During the discharge interval shown at 44, it will be noted that the internal temperature of the cell increased, whereas in the subsequent charging cycle 46 the internal cell temperature decreased. The same increase in temperature during discharge and decrease of temperature during charge are repeated at intervals 48 and 50. The electrochemical cooling effect combined with the heat losses are therefore shown to remove the heat produced during each discharge period as the cell is subsequently charged.

Figure 6:
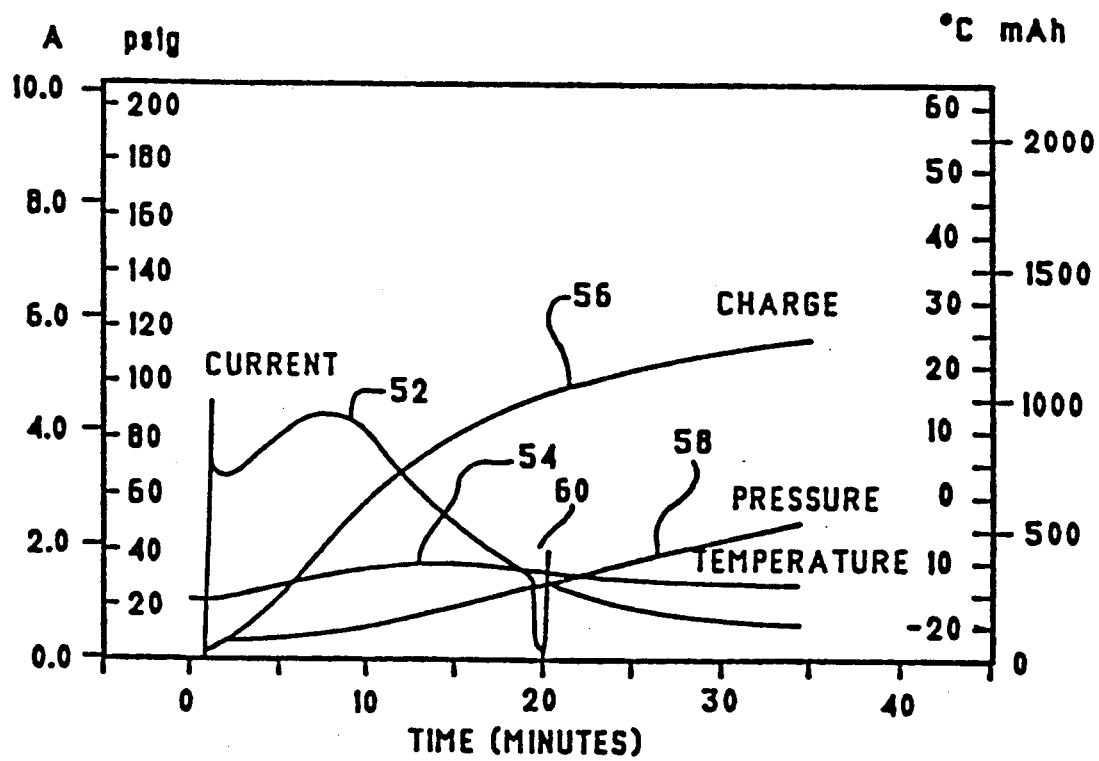
FIG. 6 is a set of curves similar to those of FIG. 4, but where the cell is cold and is charged at cold ambient temperatures.

Referring now to FIG. 6, another set of curves is shown which are similar to those of FIG. 4. However, in this case, the cell temperature is very cold, being in the range of −15 to −10° C. It will be noted that in this case the charging current curve 52 has not reached the maximum of about 5 amperes which is limited by the switching power source within the charging circuits, as the ability of the cell to accept charge was depressed due to the low temperature. There was a certain warming tendency of the temperature, curve 54, as the charge, curve 56, increased; but it is clear that as the cell warmed up and was capable of accepting a higher current, it would not overcharge and, indeed, the temperature began to decrease. The charger was operated for a 20 minute period, at which point 60 it turned off. It was then immediately restarted, and it will be noted that the charging current continued to follow the curve 52 downwardly, as expected. The pressure within the cell increased over the entire period that the charging operation continued as shown in FIG. 6, but there was clearly no excessive or dangerous buildup of cell pressure at the low cell temperatures being experienced.

Figure 7:
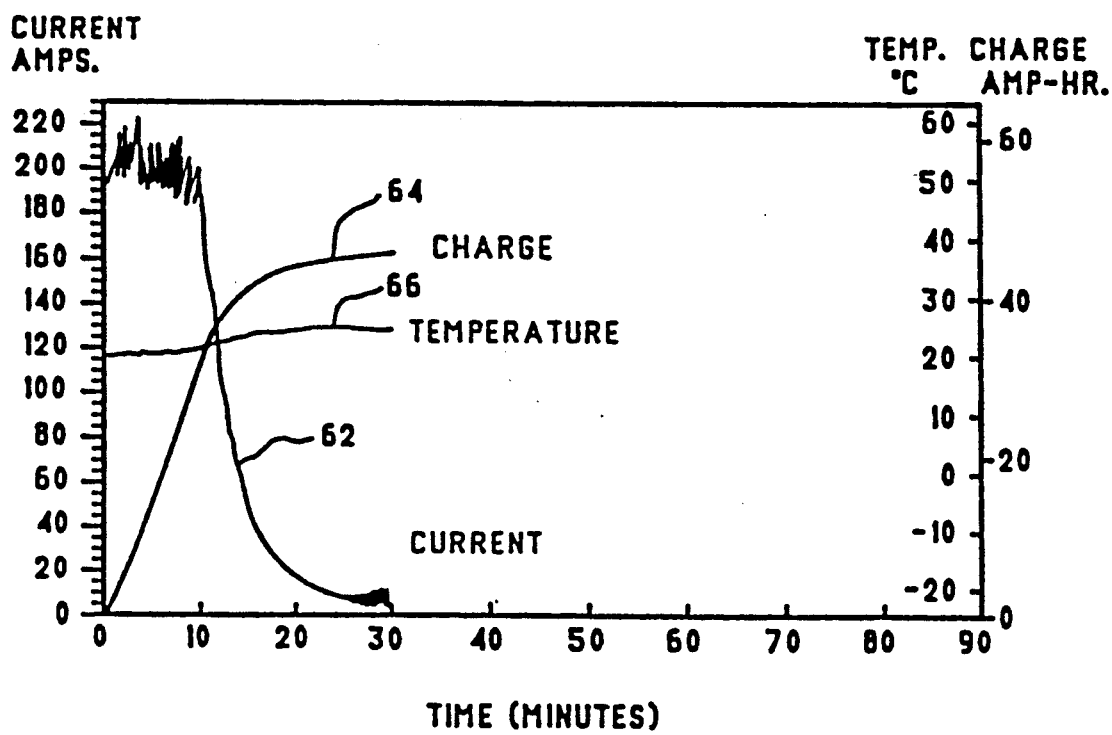
FIG. 7 is yet another set of curves showing typical charge, temperature and current characteristics of a high capacity battery which was charged over a relatively short period of time.

Finally, as to typical charging curves for various kinds of cells and batteries, FIG. 7 shows a measured charge current curve 62, a charge curve 64, and a temperature curve 66, which exhibit the charge characteristics of a nickel cadmium aircraft battery charged at an initial charging rate in the order of 200 amperes. The capacity of the battery, a large vented nickel cadmium battery having sintered plate construction, is 40 Ah. What is particularly of note is that, as shown at curve 64, approximately 85% of the charge was delivered to the battery in 10 minutes. Moreover, the internal temperature of the battery—which was charged at ambient room temperature—increased less than 10° C. The battery was fully recharged in less than 30 minutes.

A Typical Charging Circuit of the Present Invention

FIG. 8 shows a typical charging circuit, with a battery pack set up as discussed hereafter. The circuits are much simplified to show essential components, but not necessarily all components, of an actual charger. Moreover, several circuit additions which affect the variable reference voltage in keeping with the present invention, and which are dependent on such factors as temperature and charge current, are shown but may not appear in any specific charger.

Briefly, the circuit of FIG. 8 is as follows:

A source of electrical energy 70 is provided; that source may be such as 115 volts AC or 12 volts DC, or otherwise, 115 volts AC is a standard household voltage in North America, 12 volts DC is standard automobile voltage, suggesting therefore that the circuits of the present invention can be arranged to operate under ordinary household voltage circumstances or to be powered such as from the cigarette lighter of an automobile. An output 72 is provided, to which electrical charging energy is delivered; and a rechargeable battery or cell which is shown generally at 74, is connected across the output 72. A switching inverter circuit 76 of the buck type is provided in series with the source 70, and a typical switching device is MOSFET Q1. Obviously, the rate of the amount of energy being delivered to the output 72 and rechargeable battery or cell 74, and therefore the charging current, may be regulated by switching the switching inverter 76 between its conducting and non-conducting states. That switching control is, itself, under the control of a control circuit 78 which may be a pulse width modulated controller. The control circuit 78 is proportionally controlled by a control input 84 whose input is fed from sensing circuits as discussed hereafter. As a matter of convenience, the output of amplifier 86 is connected to the controller 78. Further, timing pulses coming from the timer 82 to the enable input 80 of the control circuit 78 control short interruptions of the charging current.

In an alternative approach to the portion of the circuit of FIG. 1 by which the power—that is, the charging current—is delivered to the input, it is evident that other power delivery systems that are controllable may be utilized. For example, the switching inverter device 76 is shown as utilizing a MOSFET, but it could as easily be substituted by other power control devices, as is well known in the art. Therefore, in its broadest sense, a power converter device is inserted in the series between the source 70 and the output 72. Typical examples of such a power converter device may include bipolar transistors, silicon controlled rectifiers, gate turn-off thyristors, linear regulators, or switching magnetic amplifiers, in circuits of different types and topologies.

Sensing means are provided to detect the terminal voltage of the rechargeable battery 74. They include a sensing line 88 connected to a resistor RS, so that the signal at the negative input of comparator 90, connected also to resistor R25 to form a voltage divider to ground, is a function of and directly related to the detected terminal voltage of the battery or cell 74. The other input to the comparator 90 is the reference voltage which is generated within the charging circuit, and is independent of the terminal voltage of the battery or cell 74. The reference voltage is found at line 92, and it is initially set during calibration of the circuits off the divider network R31 and P1. As noted hereafter, the value of the reference voltage on line 92 is, however, algebraically affected by compensation which is arranged for temperature of the battery or cell 74 or the ambient, depending on the mounting of temperature sensitive device 94. The value of the reference voltage on line 92 may also be algebraically affected by the value of the charging current. The temperature compensation circuit shown generally at 96 and the charge current compensation circuit shown generally at 96 are connected through jumpers J1 and J2, respectively, so that their output values are algebraically added at junction 100.

Whenever a difference occurs between the voltage reference on line 92, and the detected terminal voltage at junction 102—the inputs to comparator 90—an output signal from the comparator 90 is delivered on line 104 to a control input of latching means 106 which, for convenience, is shown as a D-type flip-flop. Control output from latching means 106 is fed on line 108 through network R34. C14 which has values so as to give it a slow time constant, to one of the input terminals of amplifier 86. The network C15, R40 which is a feedback network from the output of amplifier 86 to the other input thereof, is one having a fast time constant. In general, the speed of the controller 78 is such as to operate the switching inverter circuit 76 at frequencies of 20 kHz to 30 kHz (and in some instances, up to 100 kHz). The switching inverter circuit 76 of the buck configuration consists of the MOSFET switch Q1, diode D2, and the inductor L1.

Typically, the switching inverter circuit 76 is turned completely off for a period from 0.5 msec up to about 20 msec. and usually in the range of about 1 to 3 or 5 msec. under the control of the enable input 80. The filter capacitor C6 filters out the switching frequency of the switching inverter circuit 76, so as to preclude any unwanted effect of high frequency at the output 72.

Obviously, the duty cycle of the switching inverter device 76 is controlled by the controller 78 under its logic enable signal 80 and its proportional control signal 84.

As noted, the control signal input 84 is influenced by the output of the amplifier 86. Its output is influenced by the value of the charging current if the charge current sensing circuit 98 is operable, as described hereafter. In any event, the controller 78 can therefore be controlled at any time that charge current is flowing, but in keeping with the conditions of the operation of the charging circuit and the conditions of the charging current and the sensed terminal voltage of the rechargeable battery or cell 74, all as controlled by the output 108 of the latching device 106; and that output is, in turn, a function of the output of the comparator 90 on line 104 as determined by the comparison of the sensed terminal voltage value at junction 102 and the reference voltage on line 92.

The action of the described feedback circuit is such that, in its linear operating region when charging current is greater than zero but less than the maximum current, it will adjust the value of the charging current so that the battery voltage sensed at junction 102 at the time the output of the comparator 90 on line 104 is latched into the latching means 106, shall equal the value of the reference voltage on line 92. As noted, the reference voltage on line 92 is or may be further influenced by the value of the charging current and/or the output of the temperature sensitive device 94, if circuits 96 and/or 98 are active.

It is worth noting, therefore, that the provision of the pulsed timing signal on line 110 to the enable input 80 of controller 78, and to the clock input of the latching means 106 provides for ON-OFF control of the switching inverter 76 under the control of the timer 82. Needless to say, a clock pulse can also be provided on line 112 instead of from line 110 as a consequence of control under the alternating current source being delivered also to input 70, and being triggered thereby.

In some cases, a pressure sensitive device such as a specifically mounted strain gauge or the like, having a variable resistance depending on the pressure it is exposed to, may be mounted within the rechargeable battery or cell being charged. That is shown at 95, and it may be connected to jumper J3. The action of the pressure sensitive device 95 affects the voltage at junction 100 in much the same manner as the action of thermistor 94 affects the voltage at junction 100.

In an alternative arrangement, the output of circuits 96 and 98, which are the temperature compensation circuit and the charge current compensation circuit, respectively, (or of the pressure sensitive device RP), may instead of being connected so as to algebraically affect the reference voltage on line 92, be connected at junction 102. Such a connection is shown by the dashed line 114. In that case, the value of the reference voltage on 92 remains substantially constant, but the other input to the comparator 90 from the junction 102 is algebraically affected by the operation of the circuits 96 and/or 98. In general, a further inverter amplifier would also be inserted in the line 114, so that the effect of the output of circuits 96 and/or 98 is algebraically added to junction 102 in the opposite sense than they would be at junction 100 so as to affect the value of the reference voltage on line 92.

The effect of the temperature compensation as a consequence of the operation of the temperature sensitive device 94 and the temperature compensation circuit 96, is now discussed. Obviously, one principle purpose of temperature compensation is to avoid thermal runaway. Moreover, the charging circuit of the present invention must be capable of operating over wide temperature ranges, where the chargers or the batteries being charged, or both, may typically be found in ambient temperatures ranging from −20° C. to +50° C.

A temperature sensitive device 94 is provided. That device may be a thermistor, a temperature sensitive resistor other than a thermistor, a two terminal temperature sensitive active device, or a multi-terminal temperature sensitive active device. In any event, the output of the temperature sensitive device is a function of the temperature of the device, and that output changes in accordance with the temperature of the device. The temperature of the device is dependent on the manner in which it is mounted: the temperature sensitive device may be mounted in such a manner that its temperature is affected by the ambient in which the recharging circuit or the rechargeable battery or cell is placed; or it may be mounted in such a manner that its temperature is affected by the internal temperature of the rechargeable battery or cell. In the former condition, the temperature sensitive device may simply be mounted in a position that it is near the outside of the case of the charger, or it is near the mounting arrangement where the rechargeable battery or cell is placed. In the latter case, the temperature sensitive device may be mounted in such a manner that it is urged into close and intimate physical contact with the case or shell of the rechargeable cell or battery being charged, so that changes of internal temperature within the cell or battery affect the temperature of its case or shell and thereby are noted by the temperature sensitive device.

The temperature sensitive device 94 is mounted in such a manner that its physical mounting is noted at jacks 116 and 118. Moreover, in the circuit of FIG. 8, jack 118 is arranged that a switch 120 is open if the temperature sensitive device is in place, and is closed if it is not. In any event, the value of R20 may be such that there is an approximately linear voltage output at the junction of R19 and R20 over the range of, say, −10° C. to +60° C. Changing the value of R19 will allow adjustment of the magnitude of temperature compensation, so that if it is known for example that the battery charger will operate only with a specific battery type such as nickel cadmium or nickel-hydride, or lead-acid, different values of R19 may be chosen. The fixed resistor R21 is connected in the circuit if the temperature sensitive device 94 is removed and the switch 120 at jack 118 closes.

It will be noted that a further component identified as N19 is included in the circuit, in series with resistor R19 and jumper J1. That component N19 may be a network or device which has a complex, non-linear output, whereby the operation of the circuit as it is affected by the operation of the temperature sensitive device 94 may be more sensitive in certain ranges of temperature being sensed than in other ranges.

Moreover, an amplifier 122 is provided, and it has an input from the same junction of resistors R19 and R20, and R21. In the event that the circuit including the temperature sensitive device 94 should accidentally open, amplifier 122 will generate an RTO (temperature sensor open) signal on line 124. That line goes to an input of OR-gate 109, which is arranged so that any signal at either of its inputs will cause LED 126—which is a red LED—to illuminate. At the same time, the signal from the output of OR-gate 109 is fed to the latching device 106 at input R, and it causes the latching device to shut down and thereby to inhibit further charging current at the output 72.

It will also be noted that a second comparator 91 is provided, as well as a second latching device or flip-flop 107. The inputs to the comparator 91 are from the voltage sensing line 88, and through a voltage divider R30/R29 from the reference voltage line 92. The purpose of the comparator 91 is faulty cell sensing in the battery or cell 74. If the sensed resistance free terminal voltage of the rechargeable battery or cell 74 reduces because the cell (or a cell of the battery) is faulty, then an intolerable difference between the sensed value of the resistance free voltage and the reference voltage is noted by the comparator 91. That being the case, the output of the comparator is fed to the latching device or flip-flop 107, where a low voltage output on line 111 occurs. That low voltage output on line 111 is fed to an input of the OR-gate 109; the other input of which is the RTO signal on line 124. As noted above, a signal at either input of OR-gate 109 causes the LED 136 to illuminate, and at the same time applies the shut-down signal to input R of latching device 106.

Although associated circuitry is not specifically shown, it is obvious that the operation of the pressure sensitive device 95 may be quite similar to that of the operation of the temperature sensitive device 94. Thus, the pressure sensitive device 95 is shown connected to jumper J3, but it may also be connected through a similar circuit as is the temperature sensitive device 94; and in any event, its operation and the output from the pressure sensitive device 95 as it may be affected by the internal pressure of the rechargeable battery or cell 74, affects the voltage at junction 100 (or at junction 102, as discussed above).

It has also been noted that the reference voltage on line 92 (or the signal representing the sensed terminal voltage at junction 102) may be algebraically affected by the value of the charging current being fed to the rechargeable battery or cell 74. That is the function of the circuit 98.

Here, a current sense line 128 leads from the negative side (in this case) of the output 72, which is connected also to the positive side of the current sensing shunt R5, through smoothing filter R15, C18, to an input of amplifier 130. The gain of the amplifier 130 is determined by the value of R16/R17. The output of the amplifier 130 is connected through R18 and jumper J2 to the junction 100—or, as suggested above, in some circumstances to junction 102. In any event, the arrangement is such that, in its most simple embodiment, the output of the amplifier 130 will swing from its highest value to its lowest value when the charging current being delivered to the rechargeable battery or cell 74 and as sensed by line 128, is within a predetermined range. For example, the output of amplifier 130 for a 10 ampere charger may be at its highest value when the charging current is above 3 amperes, and at its lowest value when the charging current is below zero. Moreover, that output may swing essentially linearly over the predetermined range of current values.

It should also be noted that the presence of diode D14, when it is included, has the effect of limiting the range of operation of the circuit 98 to only those output voltages of amplifier 130 which are greater than the voltage at junction 100, (or at junction 102, as discussed above). Thus, in the case shown in the circuit of FIG. 8, amplifier 130 will exercise linear control of the reference voltage on line 92 only when the charging current is below 3 amperes, and above 1 ampere. This allows for appropriate charge current compensation over a wide variety of rechargeable cells and batteries where the type of rechargeable battery or cell to be charged is specified for a particular charger circuit. Thus, specific values of components, as to their resistance, threshold voltages, etc., can be chosen.

Still further, it is noted that counter 132 can function as a timer. Its function is to provide a signal to junction 100 at the end of a predetermined charge period, whereby the value of the voltage reference on line 92 may be lowered. This is particularly useful when charging lead-acid batteries, whereby a slightly higher initial voltage during the fast charging portion at the beginning of the charge circuit may be followed by a lower float charge voltage.

Moreover, it is noted that latching circuit 106 has an output on line 134 which goes to LED 136. The LED 136 is a green LED, and its function is to provide a visual signal confirming that the electrical charging circuits are working and that charge current is being fed through the output circuit 72. The signal on line 134 is complementary to the signal which is on line 108. If, for example, there is a constant signal on line 108 because the state and condition of the rechargeable battery or cell 74 is such that there is a continuous charging current flowing to it, then line 108 is continuously high and the output to line 134 is continuously low, thereby permitting LED 136 to be continuously illuminated. On the other hand, as the output begins to regulate, so that the charge current begins to reduce due to the modulation of the power controller or switching inverter, then the illumination of LED 136 becomes discontinuous. With appropriate values of other circuit components to adjust time constants, and the like, the LED 136 will begin flashing at a visible rate.

Several other features demonstrated in the typical charger circuit of FIG. 8 require to be discussed. For example, it is noted that current sense line 128 goes not only to amplifier 130, but also to amplifier 86. However, it has also been noted that the time constant of the circuit C15, R40 is a fast time constant, whereas the time constant of R34, C14 is a slow time constant. Therefore, the operation of the controller 78—usually a pulse width modulated controller, as noted—can be controlled by the output of the latching circuit 106 at any time that charge current is flowing to the output 72 and is sensed on the line 128; but that control is in keeping with the conditions being sensed and controlled as a consequence of the input to the comparator 90, and its output, either as a consequence of the value of the sensed resistance free terminal voltage as it is algebraically affected on line 92 or at junction 102 by the output of the temperature compensation circuits 96, the charge current compensation circuit 98, or the pressure sensitive device 95.

Of more significance, may be the arrangement of an additional resistor RS1, which is shown as being an integral part of the internal structure of the rechargeable battery 74 (it is not relevant when a single cell is connected across the output 72). This provides a means whereby the specific value of the reference voltage on line 92 may be matched at junction 102, as a consequence of the terminal voltage of the battery 74 which is, itself, a consequence of the number of cells in the battery that are connected in series or in a series/parallel arrangement. In particular, it is appropriate for the value of the reference voltage on line 92 to be specific, that is, for there to be a particular reference voltage value per cell. Therefore, it is appropriate for the charging circuit to have some means of determining how many cells there are in series, so as to set the output voltage accordingly.

This problem may come as a consequence of the requirement for a charging circuit of the present invention to charge battery packs for different kinds of handheld power tools, each of which may have a different voltage. Battery packs may also have different voltages for certain kinds of toys, camcorders, radio operated models of vehicles and vessels, etc. Very often, adjustment for various terminal voltages of battery packs can be made by changing a switch setting on the charger, but if the switch is improperly set a dangerous overcharge condition may arise.

By the present invention, the provision of a resistor RS1 within a battery pack is sufficient to provide appropriate information to the charging circuit as to the voltage necessary to be delivered to the output 72. However, it must be noted that such battery chargers as are adapted to provide variable output voltage for battery packs that have the resistor RS1 installed within them, do not have the voltage sense line 88 in the manner as shown in FIG. 8 in solid lines; rather, the voltage sense line is broken as at 140, and is picked up on line 142. The resistor RS1 replaces the resistor RS (shown in FIG. 8), which must be deleted when resistor RS1 is to be used.

The value of the resistor RS1 which is within the battery pack is, therefore, a function of the number of cells that are in the rechargeable battery 74. What that means is that a voltage drop occurs through the string RS1 and R25, so that the voltage at terminal 102 is essentially the equivalent of the single cell resistance free terminal voltage as discussed and contemplated above. For a battery having n cells, the resistance of resistor RS1 would be equal to $(n-1)$ times the resistance of resistor R25. Ordinary commercially available resistors are sufficient to provide the voltages and resistance string necessary, and it is usual to utilize semi-precision resistors that have a resistance accuracy of about 1% of rated value. There is an inherent fail safe characteristic, because if the line 142 should fail for some reason, the charger will sense a continuously low or zero voltage, and in keeping with other features discussed hereafter, it will alarm and turn off.

Obviously, the operation of the circuit of FIG. 8 can be dependent upon a number of factors, and the fine control of the circuits may be as a consequence of certain properties of the rechargeable battery or cell being sensed—notably, its internal temperature, the charge current being delivered to it, or its internal pressure—or changes in those properties being sensed. Specifically, changes in either the internal temperature or the internal pressure of the rechargeable battery or cell being charged may affect the operation of the charger, such that the charge current being delivered to the rechargeable battery or cell 74 may be altered, or the charging operation terminated. Such changes may be as a consequence of there having been a predetermined increase of the internal temperature of the rechargeable battery or cell being sensed, or a predetermined increase of the internal pressure being sensed; or even upon a predetermined absolute temperature or a predetermined absolute internal pressure of the rechargeable battery or cell being reached.

Figure 9:
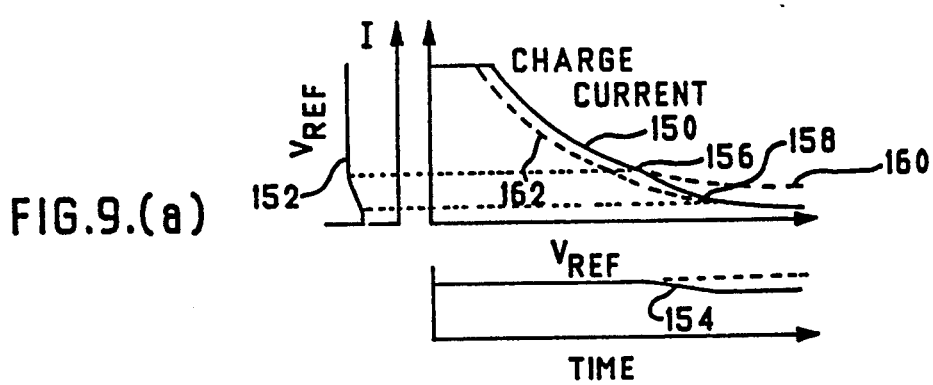
FIGS. 9 (a), (b), and (c), are typical curves showing the effects of various reference voltages as they change in time, and the various effects they have on a charging current where the charging current is, in any event, being reduced below a maximum charging current in keeping with the state of the charge acceptance capability of the cell or battery being charged.
Figure 9:
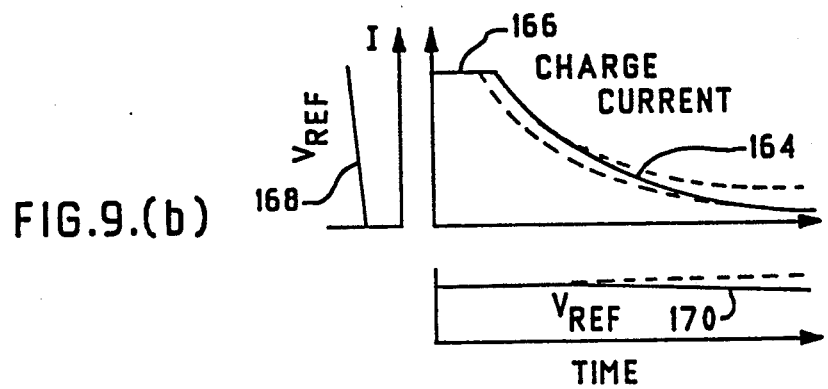
Figure 9:
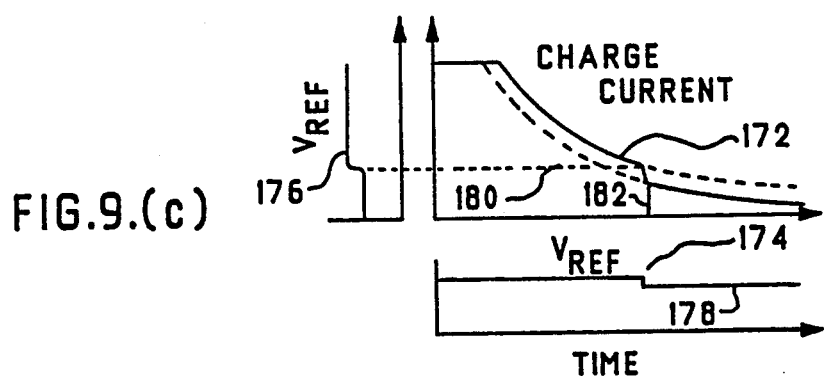

FIGS. 9(a), (b) and (c), are provided to show the effects of various reference voltages as they change in time, and to show the various effects that the changing reference voltage has on the charging current where the charging current is in the mode that it is being reduced from below a maximum charging current in keeping with the state of charge acceptance capability of the rechargeable battery or cell being charged. Each of FIGS. 9(a), 9(b) and 9(c), is a family of three curves: the principle curve is a curve showing the variation of charge current with time; beside the principle curve is a curve showing the commensurate change of reference voltage and its relationship to the charge current; and the third curve is below the principle curve and shows the change of the reference voltage with time. Obviously, the scale of current is the same in the principle curve and the curve to its side, and the scale of time is the same in the principle curve and the curve below it.

FIG. 9(a) shows a charge current curve 150, and two curves 152 and 154 showing the relation of the reference voltage against current in curve 152, and of the reference voltage against time in curve 154. The charge current in curve 150 begins as a constant current, and then reduces to a particular value, shown at 156, at which time the reference voltage in curve 152 and 154 begins to change until a further value at 158 is reached, at which time the reference voltage in curve 152 and 154 reached its lower value. If the reference voltage had not altered at a charge current value shown at 156, the charge current would have continued to follow the curve as shown at 160; and if the reference voltage had been at the level that it adopted at the charge current value shown at 158, the charge current would have followed the curve 162.

FIG. 9(b), on the other hand, shows the situation where the gain of the amplifier 130 has been reduced, so that the effect on the reference voltage on line 92 changes gradually from its higher to its lower value as the charge current varies from its full value to zero. Thus, the charge current in curve 164 remains constant at a value shown at 166 until such time as charge current regulation begins. At that time, the reference voltage as shown in curves 168 and 170 begins to decrease; it being noted that the charge current reduces from the maximum value shown at 166 at the same time that the reference voltage in curve 170 begins to decrease.

Having regard to FIG. 9(c), a stepwise change in the reference voltage is shown. Here, the charge current in curve 174 follows the same general pattern as suggested in curve 150 of FIG. 9(a), except that at a specific instant in time indicated at 174 there is a stepwise change in the value of the reference voltage as shown in curves 176 and 178. The stepwise change which may occur may be as the result of the charge current having reached a particular current threshold as shown at value 180, or as a consequence of the timer having timed out a predetermined charging period. The stepwise change in the reference voltage will generally cause a discontinuity of the charge current, as shown at the blip 182. Otherwise, the discontinuity in charge current may be followed by recovery as indicated in FIG. 9(c); and in any event it will be noted that the charge current after the blip 182 follows the lower curve similar to curve 162 in FIG. 9(a).

Obviously, the practice of varying the reference voltage as the charging process is continuing is one of considerable importance, particularly so as to preclude the possibility of thermal runaway in nickel cadmium cells, as well as for optimization of the charging cycle. Optimization results in lower energy requirements and therefore higher energy efficiency, and will itself preclude unnecessary or perspectively harmful damage to the rechargeable battery or cell as a consequence of overcharging, and the like.

The Methods of the Present Invention

The present invention provides several methods for recharging rechargeable batteries and cells. The first few steps of the differing methods are substantially constant in all events, and comprise the following steps:

(a) providing an electrical charging current from a source thereof, such as source 70, to an output 72 across which a rechargeable battery or cell 74 may be connected;

(b) periodically interrupting the flow of electrical charging current under the operation of the controller 78, and determining the resistance free terminal voltage of the rechargeable battery or cell 74 being recharged. The determination of the resistance free terminal voltage is made during the interval when the flow of electrical charging current has been interrupted. The sensed resistance free voltage is compared at comparator 90 with a reference voltage which is independent of the rechargeable battery or cell 74;

(c) for a fixed and predetermined period of time, the electrical charging current is delivered to the output 72 at the lesser of a predetermined maximum current value, or the ability of the rechargeable battery or cell 74 to accept a charging current. Thus, in the circumstance where the rechargeable battery or cell 74 has a greater ability to accept electrical charging current than is the maximum predetermined current value, the electrical charging current is delivered to the output 72 at a constant value which is equal to the maximum current value allowed by the charger;

following the first fixed period of time noted above, the electrical charging current continues to be delivered to the output at the maximum value for a second variable time period. However, that second variable time period lasts only for so long as the sensed resistance free voltage of the rechargeable battery or cell 74 is less than the independent reference voltage. Thus, the second variable time period ends at the first instance when the sensed resistance free voltage reaches the same value as the independent reference voltage. At that time, the electrical charging current is permitted to reduce, continually or stepwise in such a manner that the sensed resistance free voltage and the independent reference voltage remain at the same value.

Several optional procedures exist at this stage:

In the first instance, a timer may be operated from the beginning of the charge cycle so that, following a third predetermined period of time measured from the beginning of the charge cycle, the electrical charging current is reduced to a trickle current in the event that the charge current is still at its maximum value. Moreover, a timer can also be operated from the beginning of the charge cycle so that at the end of a fourth predetermined period of time which follows the instant when the electrical charging current has begun to be reduced, the electrical charging current is forcibly altered to a predetermined value of from zero to a predetermined lower charging current which is below the maximum current value. That value may be a trickle charge, or a finishing charge as discussed hereafter.

In the alternative, during the period of time which follows the second variable time period and while the electrical charging current is permitted to reduce, the value of the charging current can be constantly sampled on a periodic basis and compared with the value of the electrical charging current at at least a prior sampling thereof. In that case, when an increase of the electrical charging current has been sensed, the control circuit means are operated so as to force the electrical charging current to continue to reduce.

Figure 10:
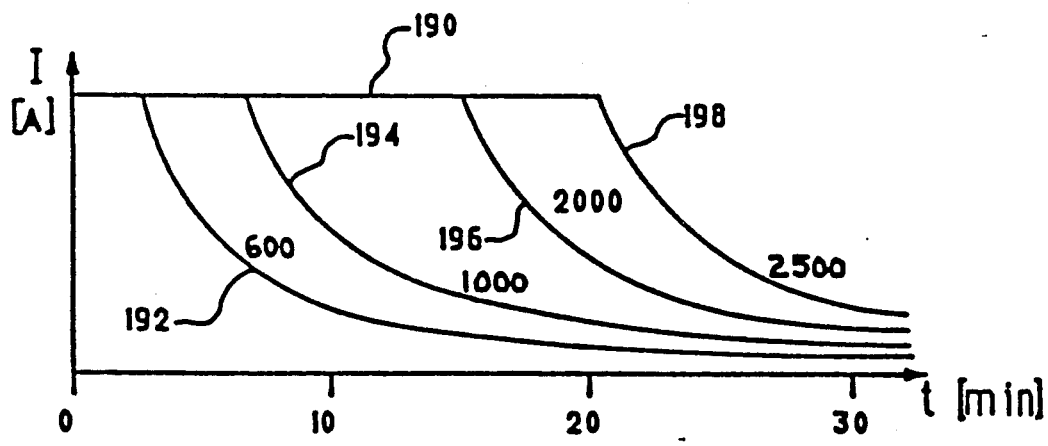
FIG. 10 is a family of typical charging curves for battery packs having various capacities, all charged with an identical maximum current.
Figure 11:
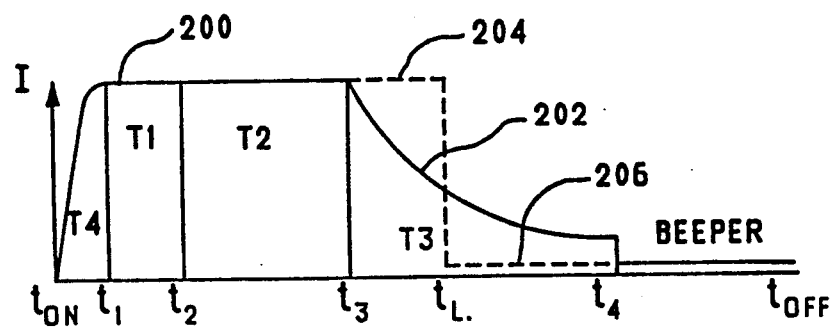
FIG. 11 is a curve showing charging current against time, where certain predetermined time periods from the beginning of a charge cycle are indicated.
Figure 12:
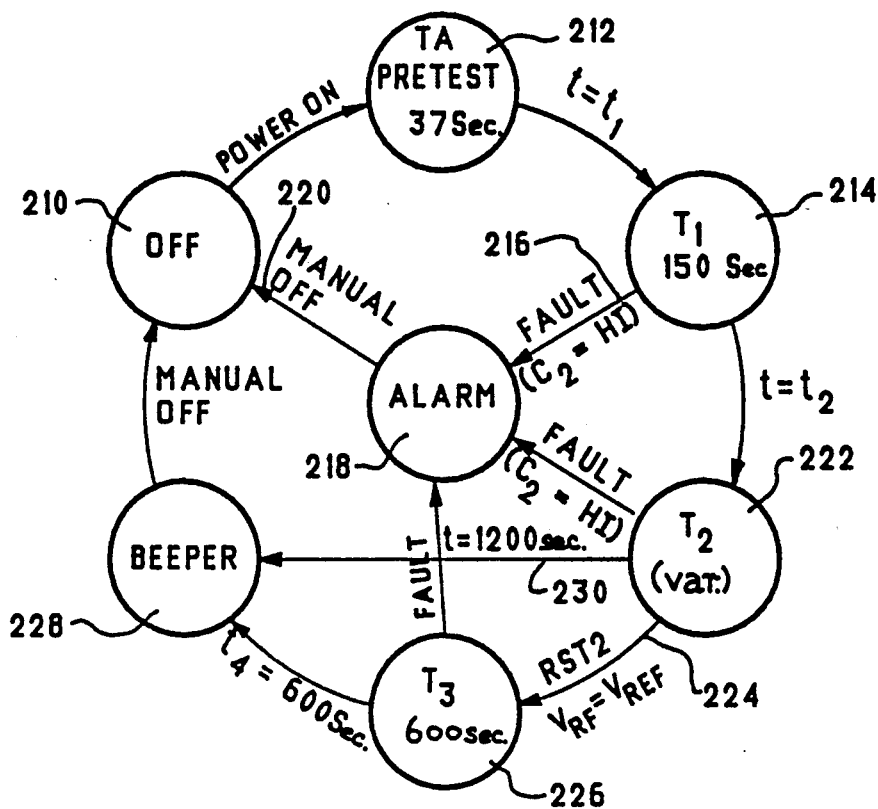
FIG. 12 is a state of change and condition diagram co-relating the various states of charge that might occur or fault conditions that might occur during charging of a battery, with reference to the time periods shown in FIG. 11.

To illustrate the above, reference is now made to FIGS. 10, 11, and 12. FIG. 10 shows a family of typical charging curves for battery packs having various capacities, all charged with an identical maximum current. FIG. 11 is a curve which shows charging current against time, with certain predetermined periods from the beginning of the charge cycle being indicated. FIG. 12 is a state diagram which co-relates the various time periods and states of charge that might occur, or the fault conditions that might occur, during charging of a battery, with reference to the time periods that are shown in FIG. 11.

First, with reference to FIG. 10, a family of typical curves is shown. Here, various capacities of battery packs ranging from 600 mAh to 2500 mAh, are shown. Each is assumed to be charged with circuits and methods according to the present invention, and with a peak current at about 7.5 amperes, as shown at 190. Curve 192 is for a battery pack having a capacity of 600 mAh, curve 194 is for a battery pack having a capacity of 1000 mAh, curve 196 is for a battery pack having a capacity of 2000 mAh, and curve 198 is for a battery pack having a capacity of 2500 mAh. There is, very clearly, a similarity of appearance among the curves. However, the curves also show that a fixed timing period of 20 minutes is just sufficient, under ideal conditions, for a battery pack having a capacity of about 1800 mAh to 2500 mAh; and far too long for a battery pack having a capacity of 500 mAh or 600 mAh up to about 1000 mAh or 1200 mAh. Obviously, it is the best practice to terminate the charge cycle as soon as practicable so as to preclude thermal runaway, and so as to provide a signal to the user that the battery pack has been charged.

Thus, a cycle of variable total length is proposed, consisting of a period of constant current, the length of which is determined by the ability of the battery pack to accept charging current under the conditions when the sensed resistance free voltage is less than the independent reference voltage, followed by a fixed time period of declining current during the time when the sensed resistance free voltage is equal to the independent reference free voltage. That cycle may last for 8 or 10 minutes.

Referring to FIG. 11, however, the detail is now provided. First, the time period T1 is for a fixed period of time, and terminates at time $t_2$. The charging current shown in curve 200 is permitted to rise to its maximum during period T1 (which, for purposes of the present discussion is assumed to include the time period TA) and reaches a predetermined maximum current value if the battery will accept current at that value, as noted above. Assuming that it does, a second variable time period T2 continues with delivery of charging current at the maximum value for so long as the sensed resistance free voltage is less than the independent reference voltage. T2 is terminated at time $t_3$. Thereafter, the electrical charging current is permitted to reduce as shown at 202 in such a manner that the sensed resistance free voltage and the independent reference voltage remain at the same value, as discussed above.

In the first option described above, a timer is operated from the beginning of the charge cycle so that at the end of a predetermined period of time T3, at time $t_L$, if the charge current is still at its maximum value as indicated at 204, the electrical charging current is reduced to a trickle current as indicated at 206.

At the same time, however, if the charge current follows curve 202, at the end of a fourth predetermined period of time which occurs at time $t_4$, which follows from time $t_3$ by a predetermined period of time, the charging current may than be forcibly altered to a predetermined value. That value may be 0, or it may be a trickle current, or a finishing charge current as is discussed hereafter.

Figure 13:
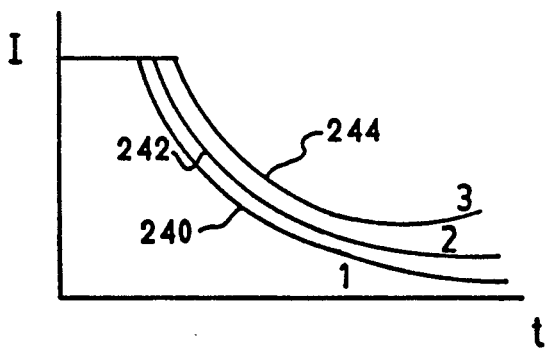
FIG. 13 shows a family of charge current versus time curves, where the condition of thermal runaway may occur.

The other option following step (c) as discussed above, is discussed in greater detail hereafter with reference to FIG. 13.

Still further, the methods of the present invention contemplate that the internal pressure of the rechargeable battery or cell being charged may be monitored. Thus, the operation of the charger may be altered, or the charging terminated, upon a determination of there having been a predetermined increase of the internal temperature or the internal pressure of the rechargeable battery or cell being charged; or upon a condition arising where a predetermined absolute internal temperature or a predetermined absolute pressure of the rechargeable battery or cell being charged, is reached.

During the period of time that the charging cycle continues, the rechargeable battery or cell is constantly monitored to determine if the cell or at least one cell in the battery being recharged is faulty. That monitoring is carried out by a determination of the sensed resistance free voltage, and a determination if the sensed resistance free voltage suddenly alters from its previous value. That determination is made by the comparator 91 as described above; or such other means as may be provided to send an explicit faulty cell signal. In any event, when a faulty cell is detected by whatever method, obviously a fault has occurred, and the electrical charging current is instantly discontinued and an alarm signal is given to that effect.

However, it may be that it is appropriate for the faulty cell testing to be inhibited for a first predetermined period of time TA, which is shorter than the first fixed period of time T1. That permits certain electric chemical settling to occur in the cell or battery when it is first connected to the charger, especially if the cell or battery is cold, or deeply discharged.

Reference is now made to FIG. 12, where values are shown that are particularly intended for a charger having a maximum current of 7.5 amperes, and intended to charge battery packs having capacities ranging from 600 mAh up to 2500 mAh, as discussed in association with FIG. 10. When the power is turned on from its off status as shown at 210, the pretest period TA at 212 exists for 37 seconds. The charger then goes to the status of period T1; and at time $t_2$ which occurs at 150 seconds, period T1 as shown at 214 terminates. If a fault is detected, as shown at line 216, an alarm status as at 218 is entered, and the charging cycle is terminated. However, the charger itself is not turned off, requiring a manual operation as shown at 220.

In the normal course of events, period T2 is now entered, and for nickel cadmium batteries having capacities in the range of 600 mAh to 1000 mAh, a maximum charging current in the order of about 7.5 amperes, and a resistance free charging voltage being in the range of about 1.3 to 1.5 volts per cell, the time period T2 terminates at time $t_3$ no more than about 8 or 10 minutes from the beginning of the charging cycle. For nickel cadmium batteries or cells having capacities in the range of 2000 mAh to 2500 mAh, and similar charging current and charging voltage values as discussed above, the time period T2 ends at time $t_3$ no more than about 15 or 20 minutes from the beginning of the charging cycle. Time period T2 is shown at 220. Here, at time $t_3$, several options might occur. If a fault is sensed, then the alarm status 218 is entered. The variable time period T2 as shown at 222 occurs for so long as the full charge current is delivered—in other words, for so long as the sensed resistance free voltage is less than the reference voltage. That period ends with the equality of the sensed resistance free voltage and the reference voltage. Then, the charging current follows curve 202 from FIG. 11, status 224 in FIG. 12, terminating at time $t_4$. However, at time $t_L$, at the end of time period T3 as at 226, if the charge current is still at its maximum value as at 204, it is immediately reduced to a trickle value as at 206. Then, following time $t_4$, a beeper stage 228 is reached where an audible alarm is sounded to alert the user that the charge is complete. Likewise, as shown on line 230, at the end of 1200 seconds from the beginning of the cycle, if the current remained at its maximum value, the beeper stage 228 is reached.

Referring now to FIG. 13, one further feature is discussed. Here, a family of charge current curves is shown, where one of them shows the condition when thermal runaway may occur. Curves 240 and 242 show the conditions where a normal reduction in charging current with time occurs. However, if the temperature of the rechargeable battery or cell increases, the charging current may follow the curve 244 in the manner discussed above. In that case, the charging current begins to increase once again, even though the condition of the sensed terminal free voltage being equal to the reference voltage may still apply.

Figure 14:
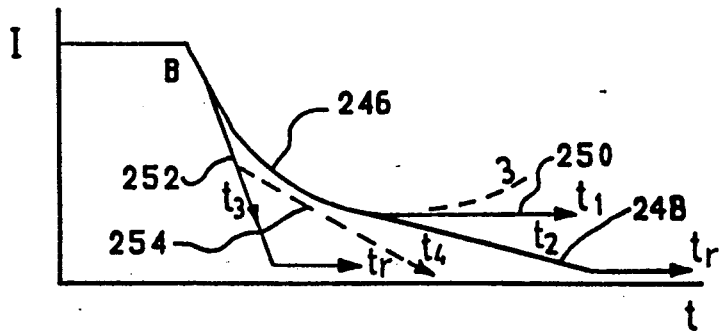
FIG. 14 shows the imposition of forced charge current control on the charge current, having reference to the typical time periods referred to in FIG. 11.

FIG. 14 shows an option whereby thermal runaway may be precluded. During the period of time that the electrical charging current is permitted to reduce, the value of the electrical charging current may be constantly sampled on a periodic basis and compared with the value of the electrical charging current at at least a prior sampling thereof. This may be accomplished e.g., by a digitally controlled sampling circuit, or by a simple analog circuit monitoring the value of the first derivative of the current value, specifically designated as a "valley detector".

Figure 15:
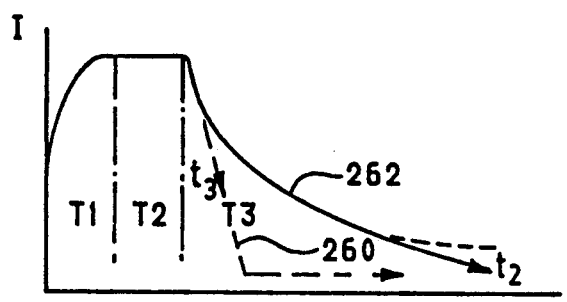
FIG. 15 shows yet another charge current versus time condition with respect to predetermined time periods with different control criteria than suggested in FIG. 14.

When, as in the case of curve 246, an increase of the electrical charging current is sensed, control circuit means take over and force the electrical charging current to continue to reduce as shown at 248. If the charging current were permitted to continue at the value shown in 250, thermal runaway would be precluded, but a high residual current is fed to the rechargeable battery or cell, and that is not necessary. Likewise, the electrical charging current may be reduced in the controlled manner as shown by curves 252 and 254, where the slopes of those curves are chosen arbitrarily, but more or less approximate the anticipated charge acceptance curve of a particular or specific battery or cell being charged. Moreover, referring to FIG. 15, which is a variation of FIG. 11, forced current reduction in curve 260 rather than as at curve 262 may be chosen, if it is determined that for the particular battery or cell being charged, an acceptable state of charge will still be reached in an acceptably short period of time.

Figure 16:
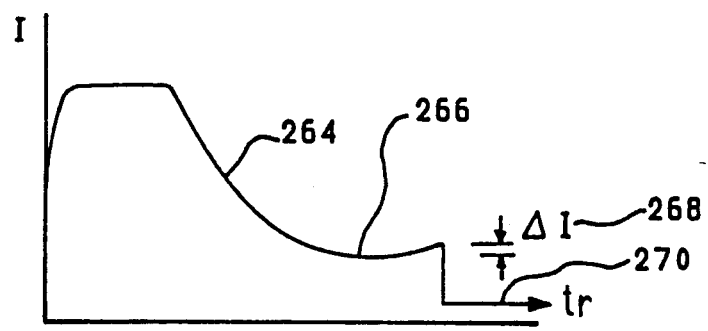
FIG. 16 is yet another charge current versus time curve showing another criterion by means of which thermal runaway may be precluded.

Referring now to FIG. 16, a specific criterion to preclude thermal runaway is illustrated. Here, the charge current as shown at curve 264 is permitted to reach a so-called current valley as indicated at 266; but if a current increase of a predetermined magnitude shown at $\delta I$, and indicated at 268, is detected, then at that point the current is forced to reduce to a trickle charge as shown at 270. Alternatively, the charging current may be forced to reduce to zero.

Finally, the concept of a finishing current for rechargeable batteries or cells is discussed with reference to FIG. 17.

It must be noted that certain circumstances arise where a rechargeable battery or cell will not be absolutely 100% fully charged if the final charging current reduces to a trickle current. Theoretically, a single cell—especially such a cell as a high rate nickel cadmium cell which has rolled electrodes—may be considered to be an infinite number of cells that are arranged in parallel one with another. Essentially, that means that the voltage between the electrodes at a distance from the portion of the electrodes where the current connections are made to them, may differ very slightly than the voltage between the electrodes at the point where the current connections are made to them—which is the same point where the resistance free terminal voltage is sensed. It has been found, however, that providing a finishing charge at a current value of between about 0.5C and 3C, will charge the battery or cell to a full 100% of its charge capacity in a short time. This is also especially true in the case of vented lead-acid batteries, where there is a substantial volume of free electrolyte which floods and covers the plates of the cells in the battery.

The present invention thereby provides for a predetermined finishing charge current value to be fed to the rechargeable battery or cell being charged, at a point in time near the end of the charge cycle. That point in time is determined as being the instant when the charging current reaches the value of the predetermined finishing charge. Then, a further charge period of constant current charging at the predetermined finishing charge current value is initiated. That charge period terminates when either a further predetermined period of time measured from the beginning of the charge cycle has expired, or when the sensed resistance free voltage of the rechargeable battery or cell being charged has increased above the value of the independent reference voltage by a predetermined amount. This is explained by reference to FIG. 17.

Figure 17:
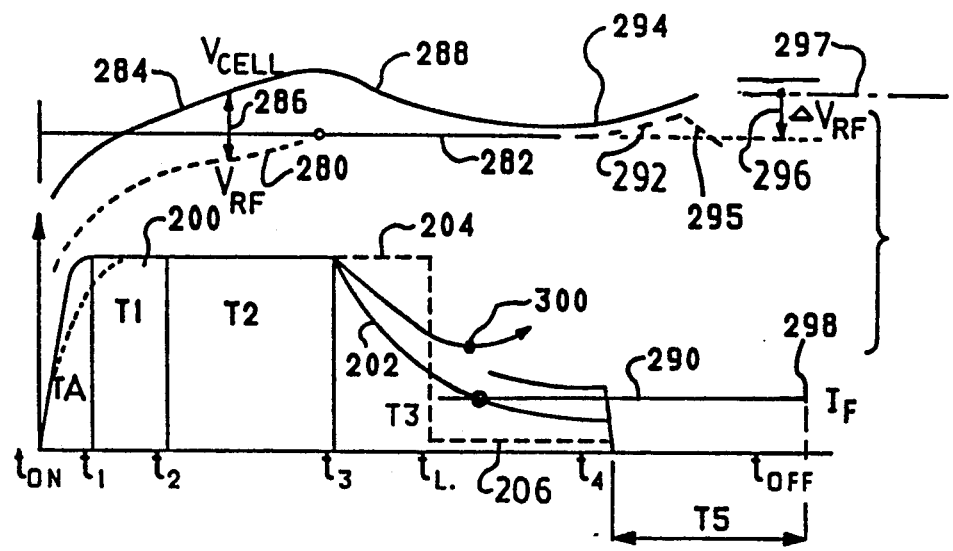
FIG. 17 is a figure similar to FIG. 11 but showing finishing charge condition; and carrying with it a related set of time curves showing the correlation of the terminal voltage and the resistance free voltage of the rechargeable battery or cell being charged.

The major portion of FIG. 17 replicates FIG. 11, and the same designations and reference numerals are applied. However, it will be noted that there is also a co-relation of the terminal voltage and the resistance free voltage, in the same time scale. Curve 280 shows the resistance free voltage rising until the time $t_3$, at which point it becomes substantially constant as shown at 282. It will be noted that the terminal voltage 284 of the cell rises with the resistance free voltage until the time $t_3$, and the difference between those voltages as shown at 286 remains constant until time $t_3$, because the current in the cell is constant as at 200. Then, as shown at curve 202, the current reduces, and therefore the terminal voltage of the cell reduces as at 288. As the current 202 reduces to the finishing charge value shown at 290, and intersects that value, it then assumes the new constant current charging at the finishing charge current value. It will be noted that the resistance free voltage continues to remain constant until the lapse of a certain period of time which is dependent upon the battery or cell being charged, but which is near the end of the charge cycle, and then the resistance free voltage and the terminal voltage begin to rise again as shown at 292 and 294. Once again the difference between those voltages is constant, but is lower in absolute value, because the finishing charge current is lower than the initial maximum charge current. When the resistance free voltage increases by a value shown at 296, the finishing charge current is terminated. Otherwise, the finishing charge current may continue if the resistance free voltage does not follow the curve 292 until a further predetermined period of time $t_{OFF}$, as shown at 298, is reached.

Alternatively, two other preconditions with respect to the sensed resistance free voltage might also be determined as being criteria to terminate the finishing charge current. They are a determination that the resistance free voltage begins to decrease, in the manner as shown at 295 in FIG. 17, or if the sensed resistance free voltage no longer continues to increase but remains constant in the manner as shown at 297. In either of those further instances, as well as the condition noted above when the resistance free voltage increases by a predetermined amount, the finishing charge current may be terminated and thereby avoid any significant overcharge condition of the rechargeable battery or cell being charged.

Obviously, the methods and imposition of the finishing charge current as shown in FIG. 17, may be imposed as well in the event that the charge current shows a tendency to increase, as indicated at 300.

It should be clear that the methods of the present invention, and indeed the circuits of the present invention, may be accomplished by adopting the use of appropriate solid state devices. For example, a programmable logic array, a microcontroller, a single chip microcomputer, or an application specific integrated circuit might control the operation of the circuits so as to permit alternative controls and to permit variable reference voltage control—where the value of the variable reference voltage is a function of a property such as the internal temperature or the internal pressure of the rechargeable battery or cell being charged. Thus, the various charge characteristics, particularly as discussed with reference to FIGS. 9 through 17 described above, may be accomplished by adopting such solid state devices as noted immediately above.

There has been described representative circuits and various alternative embodiments thereof, whereby very fast charging operation of rechargeable batteries and cells may be effected. A number of different but related methods, all having regard to the manner of operation of the circuits of the present invention, have also been described.

The scope of the present invention is, however, defined by the appended claims.

I claim:

1. A circuit for charging rechargeable batteries and cells, comprising:

a source of electrical charging energy;

an output to which said electrical charging energy is delivered and across which a rechargeable battery or cell may be connected;

power controller means in series with said source, and arranged so that the rate of energy being delivered to a rechargeable battery or cell may be regulated as to its amount under the control of at least one sensing circuit and a control circuit;

a first sensing circuit means for detecting terminal voltage of said rechargeable battery or cell;

comparator means for comparing the detected terminal voltage with a reference voltage and for providing an output signal when a difference between said voltage exists;

means for providing a pulsed timing signal;

latching means having a control input and a signal input, said latching means being arranged to be controlled by said pulsed timing signal at its control input, and having the output of said comparator connected to its signal input;

the output of said latching means being connected to control means for controlling the amount of energy being delivered by said power controller in accordance with a predetermined relationship of said detected terminal voltage and said reference voltage as indicated by the presence or absence of an output signal from said latching means and as determined during a period of time when the flow of electrical charging current to said rechargeable battery or cell has been interrupted;

whereby the operation of said control means may be affected so as to control the operation of said power controller, and so as to thereby control the rate of the amount of charging energy being delivered to said output and thereby the value of the charging current;

said recharging circuit further comprising means to determine the value of the charging current being fed to said rechargeable battery or cell at any instant in time, and a network having an amplifier whose output is connected in a circuit whereby said reference voltage is algebraically affected by the output of said amplifier; said amplifier being such as to have its output swing from its highest value to its lowest value when said charging current is within a predetermined range; and means whereby said reference voltage may be altered at any instant in time, so as to thereby affect the output of said comparator means, wherein said reference voltage is altered as a consequence of the status of the rechargeable battery or cell connected across said output at the said any instant in time.

2. The recharging circuit of claim 1, further including a temperature sensitive device having an output which is a function of the temperature of the device and which changes in accordance with its temperature, which temperature is dependent upon the mounting of said temperature sensitive device;

and wherein said temperature sensitive device is connected in a circuit whereby said reference voltage is algebraically affected by the output of said temperature sensitive device of said when its temperature is within a predetermined temperature range.

3. The recharging circuit of claim 2, wherein said temperature sensitive device is chosen from a group consisting of thermistors, temperature sensitive resistors, two terminal temperature sensitive active devices, and multi-terminal temperature sensitive active devices.

4. The recharging circuit of claim 1, further including a resistor within a battery having a number of cells being charged, which resistor has a value which is a function of the number of cells in said battery.

5. The recharging circuit of claim 1, wherein said power controller is chosen from a group consisting of silicon controlled rectifiers, linear regulators, switching regulators, and magnetic regulators.

6. The recharging circuit of claim 1, wherein pressure sensing means are provided for sensing internal pressure of said rechargeable battery or cell being charged, and wherein means are provided whereby said reference voltage is affected by the output of said pressure sensing means; whereby the operation of said recharging circuit and the delivery of charging current to said output may be controlled by the status of the internal pressure of said rechargeable battery or cell being charged.

7. A circuit for charging rechargeable batteries and cells, comprising:

a source of electrical charging energy;

an output to which said electrical charging energy is delivered and across which a rechargeable battery or cell may be connected;

a switching inverter device in series with said source, and arranged so that the rate of energy being delivered to a rechargeable battery or cell may be regulated as to its amount by switching from the conducting and non-conducting states of said switching inverter device under the control of at least one sensing circuit and a control circuit;

a first sensing circuit means for detecting terminal voltage of said rechargeable battery or cell;

comparator means for comparing the detected terminal voltage with a reference voltage and for providing an output signal when a difference between said voltages exists;

means for providing a pulsed timing signal;

latching means having a control input and a signal input, said latching means being arranged to be controlled by said pulsed timing signal at its control input, and having the output of said comparator connected to its signal input;

the output of said latching means being connected to control means for controlling the switching of said switching inverter in accordance with a predetermined relationship of said detected terminal voltage and said reference voltage as indicated by the presence or absence of an output signal from said latching means and as determined during a period of time when the flow of electrical charging current to said rechargeable battery or cell has been interrupted;

whereby the operation of said control means may be affected as to the duration of each switching sequence of said switching inverter from one of its conducting and non-conducting states to the other of said states, so as to thereby control the rate of the amount of charging energy being delivered to said output and thereby the value of the charging current;

said recharging circuit further comprising means to determine the value of the charging current being fed to said rechargeable battery or cell at any instant in time, and a network having an amplifier whose output is connected in a circuit whereby said reference voltage is algebraically affected by the output of said amplifier; said amplifier being such as to have its output swing from its highest value to its lowest value when said charging current is within a predetermined range; and means whereby said reference voltage may be altered at any instant in time, so as to thereby affect the output of said comparator means, wherein said reference voltage is altered as a consequence of the status of the rechargeable battery or cell connected across said output at the said any instant in time.

8. The recharging circuit of claim 7, further including temperature sensitive device having an output which is a function of the temperature of the device and which changes in accordance with its temperature, which temperature is dependent upon the manner in which said temperature sensitive device is mounted in said circuit;

and wherein said temperature sensitive device is connected in a circuit whereby said reference voltage is algebraically affected by the output of said temperature sensitive device when its temperature is within a predetermined temperature range.

9. The recharging circuit of claim 8, wherein said temperature sensitive device is mounted in such a manner that its temperature is affected by ambient temperature where said recharging circuit or said rechargeable battery or cell is placed.

10. The recharging circuit of claim 8, wherein said temperature sensitive device is mounted in such a manner that its temperature is affected by the internal temperature of said rechargeable battery or cell.

11. The recharging circuit of claim 9, wherein said temperature sensitive device is chosen from a group consisting of thermistors, temperature sensitive resistors, two terminal temperature sensitive active devices, and multi-terminal temperature sensitive active devices.

12. The recharging circuit of claim 10, wherein said temperature sensitive device is chosen from a group consisting of thermistors, temperature sensitive resistors, two terminal temperature sensitive active devices, and multi-terminal temperature sensitive active devices.

13. The recharging circuit of claim 8, wherein means are provided to detect whether said temperature sensitive device is present or absent, and to emit a signal indicative of the fact that said temperature sensitive device is absent, and wherein said signal also functions to cause cessation of said delivery of said electrical charging energy to said output.

14. The recharging circuit of claim 13, wherein said signal which is indicative of the fact that said temperature sensitive device is absent also functions to render said latching means in a condition that no control output is emitted therefrom.

15. The recharging circuit of claim 7, wherein the value of the output of said amplifier is a function of said charging current when said charging current is within said predetermined range.

16. The recharging circuit of claim 7, wherein said source of electrical energy is a direct current source.

17. The recharging circuit of claim 7, wherein said source of electrical energy is a rectified alternating current source.

18. The recharging circuit of claim 7, wherein said pulsed timing signal is generated by a timer circuit within said recharging circuit.

19. The recharging circuit of claim 18, wherein said pulsed timing signal is triggered by an alternating current source.

20. The recharging circuit of claim 7, wherein said latching means has an output which is complementary to said output connected to said control means, said complementary signal being arranged to provide a further signal confirming that said electrical charging energy is being delivered to said output.

21. The recharging circuit of claim 7, further including a resistor within a battery having a number of cells being charged, which resistor has a value which is a function of the number of cells in said battery.

22. The recharging circuit of claim 7, wherein pressure sensing means are provided for sensing internal pressure of said rechargeable battery or cell being charged, and wherein means are provided whereby said reference voltage is affected by the output of said pressure sensing means; whereby the operation of said recharging circuit and the delivery of charging current to said output may be controlled by the status of the internal pressure of said rechargeable battery or cell being charged.

23. A circuit for charging rechargeable batteries and cells, comprising:
a source of electrical charging energy;
an output to which said electrical charging energy is delivered and across which a rechargeable battery or cell may be connected;
a switching inverter device in series with said source, and arranged so that the rate of energy being delivered to a rechargeable battery or cell may be regulated as to its amount by switching from the conducting and non-conducting states of said switching inverter device under the control of at least one sensing circuit and a control circuit;
a first sensing circuit means for detecting terminal voltage of said rechargeable battery or cell;
comparator means for comparing the detected terminal voltage with a reference voltage and for providing an output signal when a difference between said voltages exists;
means for providing a pulsed timing signal;
latching means having a control input and a signal input, said latching means being arranged to be controlled by said pulsed timing signal at its control input, and having the output of said comparator connected to its signal input;
the output of said latching means being connected to control means for controlling the switching of said switching inverter in accordance with a predetermined relationship of said detected terminal voltage and said reference voltage as indicated by the presence or absence of an output signal from said latching means and as determined during a period of time when the flow of electrical charging current to said rechargeable battery or cell has been interrupted;
whereby the operation of said control means may be affected as to the duration of each switching sequence of said switching inverter from one of its conducting and non-conducting states to the other of said states, so as to thereby control the rate of the amount of charging energy being delivered to said output and thereby the value of the charging current;

said recharging circuit further comprising means to determine the value of the charging current being fed to said rechargeable battery or cell at any instant in time, and a network having an amplifier whose output is connected in a circuit whereby said reference voltage is algebraically affected by the output of said amplifier; said amplifier being such as to have its output swing from its highest value to its lowest value when said charging current is within a predetermined range; and means whereby the value of said detected terminal voltage as it is fed to said comparator means for comparison with said reference voltage may be altered as a consequence of the status of the rechargeable battery or cell connected across said output at any instant in time.

24. The recharging circuit of claim 23, further including a temperature sensitive device having an output which is a function of the temperature of the device and which changes in accordance with its temperature, which temperature is dependent upon the mounting of said temperature sensitive device;

and wherein said temperature sensitive device is connected in a circuit whereby said detected terminal voltage is algebraically affected by the output of said temperature sensitive device when its temperature is within a predetermined temperature range.

25. The recharging circuit of claim 24, wherein said temperature sensitive device is chosen from a group consisting of thermistors, temperature sensitive resistors, two terminal temperature sensitive active devices, and multi-terminal temperature sensitive active devices.

26. The recharging circuit of claim 23, further including a resistor within a battery having a number of cells being charged, which resistor has a value which is a function of the number of cells in said battery.

27. The recharging circuit of claim 23, wherein pressure sensing means are provided for sensing a internal pressure of said rechargeable battery or cell being charged, and wherein means are provided whereby said reference voltage is affected by the output of said pressure sensing means; whereby the operation of said recharging circuit and the delivery of charging current to said output may be controlled by the status of the internal pressure of said rechargeable battery or cell being charged.

28. A circuit for charging rechargeable batteries and cells, comprising:

a source of electrical charging energy;

an output to which said electrical charging energy is delivered and across which a rechargeable battery or cell may be connected;

power controller means in series with said source, and arranged so that the rate of energy being delivered to a rechargeable battery or cell may be regulated as to its amount under the control of at least one sensing circuit and a control circuit;

a first sensing circuit means for detecting terminal voltage of said rechargeable battery or cell;

comparator means for comparing the detected terminal voltage with a reference voltage and for providing an output signal when a difference between said voltages exists;

means for providing a pulsed timing signal;

latching means having a control input and a signal input, said latching means being arranged to be controlled by said pulsed timing signal at its control input, and having the output of said comparator connected to its signal input;

the output of said latching means being connected to control means for controlling the amount of energy being delivered by said power controller in accordance with a predetermined relationship of said detected terminal voltage and said reference voltage as indicated by the presence or absence of an output signal from said latching means and as determined during a period of time when the flow of electrical charging current to said rechargeable battery or cell has been interrupted;

whereby the operation of said control means may be affected so as to control the operation of said power controller, and so as to thereby control the rate of the amount of charging energy being delivered to said output and thereby the value of the charging current;

said recharging circuit further comprising means to determine the value of the charging current being fed to said rechargeable battery or cell at any instant in time, and a network having an amplifier whose output is connected in a circuit whereby said reference voltage is algebraically affected by the output of said amplifier; said amplifier being such as to have its output swing from its highest value to its lowest value when said charging current is within a predetermined range; and means whereby the value of said detected terminal voltage as it is fed to said comparator means for comparison with said reference voltage may be altered as a consequence of the status of the rechargeable battery or cell connected across said output at any instant in time.

29. The recharging circuit of claim 28, further including a temperature sensitive device having an output which is a function of the temperature of the device and which changes in accordance with its temperature, which temperature is dependent upon the mounting of said temperature sensitive device;

and wherein said temperature sensitive device is connected in a circuit whereby said detected terminal voltage is algebraically affected by the output of said temperature sensitive device when its temperature is within a predetermined temperature range.

30. The recharging circuit of claim 29, wherein said temperature sensitive device is chosen from a group consisting of thermistors, temperature sensitive resistors, two terminal temperature sensitive active devices, and multi-terminal temperature sensitive active devices.

31. The recharging circuit of claim 28, further including a resistor within a battery having a number of cells being charged, which resistor has a value which is a function of the number of cells in said battery.

32. The recharging circuit of claim 28, wherein said power controller is chosen from a group consisting of silicon controlled rectifiers, linear regulators, switching regulators, and magnetic regulators.

33. The recharging circuit of claim 28, wherein pressure sensing means are provided for sensing internal pressure of said rechargeable battery or cell being charged, and wherein means are provided whereby said reference voltage is affected by the output of said pressure sensing means; whereby the operation of said recharging circuit and the delivery of charging current to said output may be controlled by the status of the internal pressure of said rechargeable battery or cell being charged.

34. A method of recharging rechargeable batteries and cells, comprising the steps of:
(a) providing an electrical charging current from a source thereof to an output across which a rechargeable battery or cell may be connected;
(b) periodically interrupting the flow of electrical charging current to said output and determining the resistance free terminal voltage of the rechargeable battery or cell being recharged during the interval when said flow of electrical charging current has been interrupted, and comparing the sensed resistance free voltage with a reference voltage independent of the rechargeable battery or cell being recharged;
(c) wherein for a first fixed and predetermined period of time, said electrical charging current is delivered to said output at the lesser of either a predetermined maximum current value or a current which said rechargeable battery or cell can accept without any substantial rise in its internal temperature; whereby when said rechargeable battery or cell can accept a charging current which is greater than said predetermined maximum current value, said electrical charging current is delivered to said output at a constant value equal to said maximum current value;
and wherein, following said first fixed period of time said electrical charging current continues to be delivered to said output at said maximum value for a second variable time period which exists for so long as said sensed resistance free voltage of the rechargeable battery or cell being recharged is less than said independent reference voltage, whereby said second variable time period is terminated at the first instance when said sensed resistance free voltage reaches the same value as said independent reference voltage, and said electrical charging current is permitted to reduce in such a manner that the sensed resistance free voltage and said independent reference voltage remain at the same value;
(d) operating a timer from the beginning of the charge cycle so that, following a third predetermined period of time from the beginning of the charge cycle, the electrical charging current is reduced to a predetermined value of from zero to a predetermined low charging current in the event that the charge current is still at said maximum value; and
(e) operating a timer from the beginning of the charge cycle so that at the end of a fourth predetermined period of time which follows the instant when the electrical charging current begins to be reduced, the electrical charging current is forceably altered to a predetermined value of from zero to a predetermined low charging current which is below said predetermined maximum current value.

35. The method of claim 34, wherein the rechargeable battery or cell being recharged is constantly monitored to determine if the cell or at least one cell in the battery being recharged is faulty; and
wherein in the event of a faulty cell being detected, the electrical charging current is instantaneously discontinued and an alarm signal to that effect is given.

36. The method of claim 35, wherein the continual testing for a faulty cell is inhibited for a first predetermined period of time which is shorter than said first fixed period of time during which said charging current is delivered to said output at its maximum value.

37. The method of claim 34, wherein, for nickel cadmium batteries and cells having capacities in the range of 500 mAh to 1200 mAh, and with a maximum value of electrical charging current being in the order of 7.5 amperes and the resistance free charging voltage being in the range of 1.5 volts per cell, said second variable time period for cells in good condition terminates in about no more than about 8 or 10 minutes from the beginning of the charging cycle; and
for nickel cadmium cells or batteries having capacities in the range of 1800 mAh to 2500 mAh and similar charging current and charging voltage values, said second variable period of time terminates in no more than about 15 or 20 minutes from the beginning of the charging cycle.

38. The method of claim 34, wherein step (e) is carried out to forceably reduce the electrical charging current to a trickle current.

39. The method of claim 34, wherein step (e) is carried out to alter said charging current to a predetermined finishing charge current value of between about 0.5 C and 3 C; and terminating said finishing charge current at the first instance where either a fifth predetermined period of time measured from the beginning of the charge cycle expires, or the sensed resistance free voltage of the rechargeable battery or cell being charged has increased above the value of said independent reference voltage by a predetermined amount.

40. A method of recharging rechargeable batteries and cells, comprising the steps of:
(a) providing an electrical charging current from a source thereof to an output across which a rechargeable battery or cell may be connected;
(b) periodically interrupting the flow of electrical charging current to said output and determining the resistance free terminal voltage of the rechargeable battery or cell being recharged during the interval when said flow of electrical charging current has been interrupted, and comparing the sensed resistance free voltage with a reference voltage independent of the rechargeable battery or cell being recharged;
(c) wherein for a first fixed and predetermined period of time, said electrical charging current is delivered to said output at the lesser of either a predetermined maximum current value or a current which said rechargeable battery or cell can accept without any substantial rise in its internal temperature; whereby when said rechargeable battery or cell can accept a charging current which is greater than said predetermined maximum current value, said electrical charging current is delivered to said output at a constant value equal to said maximum current value;
and wherein, following said first fixed period of time said electrical charging current continues to be delivered to said output at said maximum value for a second variable time period which exists for so long as said sensed resistance free voltage of the rechargeable battery or cell being recharged is less than said independent reference voltage, whereby said second variable time period is terminated at the first instance when said sensed resistance free voltage reaches the same value as said independent reference voltage, and said electrical charging current is permitted to reduce in such a manner that the sensed resistance free voltage and said independent reference voltage remain substantially at the same value;

(d) constantly sampling said electrical charging current on a periodic basis during the period of time which follows said second variable time period and while said electrical charging current is permitted to reduce, and comparing the value of said electrical charging current at each sampling instant with the value of said electrical charging current at at least the prior sampling instant thereof; and when any increase of said electrical charging current is sensed, operating a control circuit means so as to force said electrical charging current to continue to reduce.

41. The method of claim 40, wherein said electrical charging current is reduced in a controlled manner to a predetermined value of from zero to a predetermined low charging current which is below said predetermined maximum current value.

42. The method of claim 40, wherein, upon a decrease of current of at least a predetermined amount within a predetermined period of time being sensed, control circuit means are operated to force said electrical charging current to assume a different charge of value over a further predetermined period of time.

43. The method of claim 41, wherein said charging current is reduced to a predetermined finishing charge current value of between about 0.5 C and 3 C, instituting a further charge period of constant current charging at said predetermined finishing charge current value; and terminating said finishing charge current at the first instance where any one of a group of criteria is reached, said group of criteria consisting of:

(i) when a further predetermined period of time measured from the beginning of the charge cycle expires; (ii) the sensed resistance free voltage of the rechargeable battery or cell being charged has increased above the value of said independent reference voltage by a predetermined amount; (iii) the sensed resistance free voltage of the rechargeable battery or cell being charged ceases to rise and begins to decrease; and (iv) the sensed resistance free voltage of the rechargeable battery or cell being charged ceases to rise and remains constant.

44. A method of recharging rechargeable batteries and cells, comprising the steps of:

(a) providing an electrical charging current from a source thereof to an output across which a rechargeable battery or cell may be connected;

(b) periodically interrupting the flow of electrical charging current to said output and determining the resistance free terminal voltage of the rechargeable battery or cell being recharged during the interval when said flow of electrical charging current has been interrupted, and comparing the sensed resistance free voltage with a reference voltage independent of the rechargeable battery or cell being recharged;

(c) wherein for a first fixed and predetermined period of time, said electrical charging current is delivered to said output at the lesser of either a predetermined maximum current value or a current which said rechargeable battery or cell can accept without any substantial rise in its internal temperature; whereby when said rechargeable battery or cell can accept a charging current which is greater than said predetermined maximum current value, said electrical charging current is delivered to said output at a constant value equal to said maximum current value;

and wherein, following said first fixed period of time said electrical charging current continues to be delivered to said output at said maximum value for a second variable time period which exists for so long as said sensed resistance free voltage of the rechargeable battery or cell being recharged is less than said independent reference voltage, whereby said second variable time period is terminated at the first instance when said sensed resistance free voltage reaches the same value as said independent reference voltage, and said electrical charging current is permitted to reduce in such a manner that the sensed resistance free voltage and said independent reference voltage remain at the same value; and (d) sensing said charging current as it is reducing, and when said charging current reaches a predetermined finishing charge current value of between about 0.5 C and 3 C, instituting a further charge period of constant current charging at said predetermined finishing charge current value; and terminating said finishing charge current at the first instance where any one of a group of criteria is reached, said group of criteria consisting of:

(i) when a further predetermined period of time measured from the beginning of the charge cycle expires; (ii) the sensed resistance free voltage of the rechargeable battery or cell being charged has increased above the value of said independent reference voltage by a predetermined amount; (iii) the sensed resistance free voltage of the rechargeable battery or cell being charged cease to rise and begins to decrease; and (iv) the sensed resistance free voltage of the rechargeable battery or cell being charged ceases to rise and remains constant.

45. A method of recharging rechargeable batteries and cells, comprising the steps of:

(a) providing an electrical charging current from a source thereof to an output across which a rechargeable battery or cell may be connected;

(b) periodically interrupting the flow of electrical charging current to said output and determining the resistance free terminal voltage of the rechargeable battery or cell being recharged during the interval when said flow of electrical charging current has been interrupted, and comparing the sensed resistance free voltage with a reference voltage independent of the rechargeable battery or cell being recharged;

(c) wherein for a first fixed and predetermined period of time, said electrical charging current is delivered to said output at the lesser of either a predetermined maximum current value or a current which said rechargeable battery or cell can accept without any substantial rise in its internal temperature; whereby when said rechargeable battery or cell can accept a charging current which is greater than said predetermined maximum current value, said electrical charging current is delivered to said output at a constant value equal to said maximum current value;

and wherein, following said first fixed period of time said electrical charging current continues to be delivered to said output at said maximum value for a second variable time period which exists for so long as said sensed resistance free voltage of the rechargeable battery or cell being recharged is less than said independent reference voltage, whereby said second variable time period is terminated at the first instance when said sensed resistance free voltage reaches the same value as said independent reference voltage, and said electrical charging current is permitted to reduce in such a manner that the sensed resistance free voltage and said independent reference voltage remain substantially at the same value; and (d) sensing at least one of the internal temperature of the rechargeable battery or cell being recharged and the internal pressure of the rechargeable battery or cell being recharged during the period of time which follows said second variable time period and while said electrical charging current is permitted to reduce; and when a chosen one of the criteria taken from a group consisting of a predetermined temperature rise, a predetermined absolute internal temperature, a predetermined internal pressure rise, and a predetermined absolute internal pressure of said rechargeable battery or cell being charged is reached, terminating the flow of said electrical charging current to said rechargeable battery or cell being recharged.

46. The method of claim 45, wherein the internal temperature of the rechargeable battery or cell being charged is sensed, and the flow of said electrical charging current is terminated when a predetermined absolute temperature or a predetermined temperature rise is reached.

47. The method of claim 45, wherein the internal pressure of the rechargeable battery or cell being charged is sensed, and the flow of said electrical charging current is terminated when a predetermined absolute pressure or a predetermined pressure rise is reached.

48. The method of claim 45, wherein each of the internal temperature and internal pressure of the rechargeable battery or cell being charged is sensed, and the flow of said electrical charging current is terminated when any of a predetermined absolute temperature, a predetermined temperature rise, a predetermined absolute pressure, or a predetermined pressure rise, is reached.

* * * * *